US009553654B2

(12) United States Patent
Zhang et al.

(10) Patent No.: US 9,553,654 B2
(45) Date of Patent: *Jan. 24, 2017

(54) METHODS AND SYSTEMS FOR WIRELESS NETWORKS RELAYS

(71) Applicant: APPLE INC., Cupertino, CA (US)

(72) Inventors: Hang Zhang, Nepean (CA); Jianglei Ma, Kanata (CA); Peiying Zhu, Kanata (CA); Mo-Han Fong, L'original (CA); Wen Tong, Ottawa (CA)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,506

(22) Filed: Dec. 10, 2015

(65) Prior Publication Data
US 2016/0099766 A1    Apr. 7, 2016

Related U.S. Application Data

(60) Continuation of application No. 13/617,490, filed on Sep. 14, 2012, now Pat. No. 9,215,002, which is a (Continued)

(51) Int. Cl.
*H04B 7/14*    (2006.01)
*H04B 7/155*   (2006.01)
(Continued)

(52) U.S. Cl.
CPC ............... *H04B 7/14* (2013.01); *H04B 7/155* (2013.01); *H04L 27/2601* (2013.01); (Continued)

(58) Field of Classification Search
CPC .. H04B 7/14; H04L 27/2601; H04W 72/0446; H04W 84/047; H04W 88/04
See application file for complete search history.

(56) References Cited

U.S. PATENT DOCUMENTS 5,640,414 A * 6/1997 Blakeney, II ......... H04W 36/18
                                                   370/332
5,917,811 A * 6/1999 Weaver, Jr. ........... H04W 36/32
                                                   370/332

(Continued)

OTHER PUBLICATIONS

Messerges et al., "A Security Design for a General Purpose, Self-Organizing, Multihop Ad Hoc Wireless Network", Procceedings of the $1^{st}$ AMC Workshop Security of Ad Hoc and Senor Networks Fairfax, Virginia, 2003, 11 pages.

*Primary Examiner* — Abdelnabi O Musa
(74) *Attorney, Agent, or Firm* — Fay Kaplun & Marcin, LLP

(57) ABSTRACT

Methods and systems are provided for use with wireless networks having one or more cell in which each cell includes a base station (BS), at least one relay station (RS) and at least one mobile station (MS). The at least one relay station can be used as an intermediate station for providing communication between the BS and MS. Methods are provided for allocating OFDM resources for communicating between the BS, RS and/or MS for example dividing transmission resources into uplink and downlink transmissions and methods of inserting pilot symbols into
transmission resources used by the RS. In some embodiments on the invention, the methods are consistent and/or can be used in conjunction with existing standards such as 802.16e.

20 Claims, 15 Drawing Sheets

Related U.S. Application Data division of application No. 12/300,522, filed as application No. PCT/CA2007/000965 on May 31, 2007, now Pat. No. 9,071,321.

(60) Provisional application No. 60/870,417, filed on Dec. 18, 2006, provisional application No. 60/863,873, filed on Nov. 1, 2006, provisional application No. 60/822,960, filed on Aug. 21, 2006, provisional application No. 60/809,341, filed on May 31, 2006.

(51) Int. Cl.
*H04W 88/04* (2009.01)
*H04L 27/26* (2006.01)
*H04W 72/04* (2009.01)
*H04W 84/04* (2009.01)

(52) U.S. Cl.
CPC ....... *H04W 72/0446* (2013.01); *H04W 88/04* (2013.01); *H04W 72/04* (2013.01); *H04W 84/047* (2013.01)

(56) References Cited

U.S. PATENT DOCUMENTS

| | | | |
|---|---|---|---|
| 2005/0192024 A1* | 9/2005 | Sheynblat | G01S 5/0263 455/456.1 |
| 2005/0207451 A1* | 9/2005 | Partyka | H04B 1/7156 370/503 |
| 2006/0120355 A1* | 6/2006 | Zreiq | H04L 29/06027 370/352 |
| 2007/0201392 A1* | 8/2007 | Ramachandran | H04L 45/00 370/315 |
| 2010/0296611 A1* | 11/2010 | Maltsev | H04B 1/70757 375/343 |

* cited by examiner

METHODS AND SYSTEMS FOR WIRELESS NETWORKS RELAYS

RELATED APPLICATIONS

This application is a divisional application of U.S. patent application Ser. No. 12/300,522 filed on Nov. 12, 2008, which claims the benefit of and is a National Phase Entry of International Application No. PCT/CA2007/000965 filed May 31, 2007, and claims the benefit of U.S. Provisional Patent Application Nos. 60/809,341 filed on May 31, 2006, 60/822,960 filed on Aug. 21, 2006, 60/863,873 filed on Nov. 1, 2006 and 60/870,417 filed on Dec. 18, 2006, which are all hereby incorporated by reference in their entirety.

FIELD OF THE INVENTION

The invention relates to the field of wireless communications, more specifically to systems and methods for supporting Orthogonal Frequency Division Multiplexed (OFDM) communication using relays.

BACKGROUND OF THE INVENTION

Orthogonal frequency division multiplexing (OFDM) is a form of multiplexing that distributes data over a number of carriers that have a very precise spacing in the frequency domain. The precise spacing of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems.

In some wireless networks, a mobile station (MS) in a given cell is only served by its serving base station (BS).

One drawback of such wireless networks is that MSs near an edge of the given cell suffer performance loss due to interference from other cells in cellular networks and propagation loss in non-cellular networks which results in limited data rates and gaps in coverage of the given cell.

While soft hand off can be used in cellular networks to improve performance to some extent for MSs at the cell edge, the improved performance comes at the cost of additional system complexity and a spectrum efficiency penalty.

One way to improve the performance is to introduce a fixed or mobile relay station (RS) into wireless networks. The use of an RS may provide a) enhanced system capacity, b) enhanced data rate and cell coverage, c) reduced MS transmit power requirements and d) allow less expensive power amplification.

SUMMARY OF THE INVENTION

According to an aspect of the invention, there is provided a method for use in an OFDM communication system employing relay stations comprising: dividing communications into frames each comprising multiple OFDM symbols; dividing the frames into first and second groups of frames, the first group of frames being used for communication between a base station (BS) and first tier RSs one-hop away from the BS, and for communications between the BS and its respective mobile stations (MSs), the first group also being used for communication between RSs of a 2Nth tier and RSs of a 2N+1th tier, N>=1, the RSs of the 2Nth tier being 2N hops away from the BS, and any MSs the RSs of the 2Nth tier are communicating with, and the second group of frames being used for communication between RSs of a 2N−1th tier and the RSs of a 2Nth tier, the RSs of the 2N−1th tier being 2N−1 hop(s) away from the BS, and any MSs the RSs of the 2N−1th tier are communicating with.

In some embodiments, dividing the frames comprises dividing the frames such that the first group is odd frames and the second group is even frames.

In some embodiments, the method further comprises: the BS communicating with mobile stations during the second group of frames at a reduced transmission power with respect to the transmission power used for transmitting to the RSs.

In some embodiments, the method further comprises, after entry into a network, each relay station transmitting a preamble and frame control header (FCH) channel on every frame.

In some embodiments, the method further comprises: defining DL RS_Zones for downlink transmission from a base station or an RS to another RS and UL RS_Zones for uplink transmission from an RS to another RS, or from an RS to BS, with remaining resources available for communication with MSs.

In some embodiments, defining DL RS_Zones comprises defining a zone size and a DL RS Zone starting location within the frame in time-frequency according to one of: a fixed size; a size that is slowly changed through a management media access control (MAC) message; a size that is dynamically changed and forecast by BS and DL transmitting RSs subsequent to the change.

In some embodiments, the method further comprises transmitting R-MAP information to indicate the resource assignments for the DL RS_Zone and/or the UL RS_Zone.

In some embodiments, transmitting the RS-MAP includes transmitting one or more of: resource location information, resource size information, and modulation and coding scheme (MCS) information.

In some embodiments, the location information is a fixed offset relative to the beginning of a frame or a fixed offset relative to RS_Zone.

In some embodiments, the modulation and code information is provided by at least one of: slowly updating the MCS information based on worst link budgets among all attached RS; and multicasting the MCS information to the corresponding RSs when needed.

In some embodiments, transmitting multiple RS-MAP, each RS-MAP for a respective one RS or multiple RSs with similar channel qualities.

According to an aspect of the invention, there is provided a method for use in an OFDM communication system employing relay stations (RSs) comprising: assigning a distinct pseudo-random noise (PN) sequence to each base station (BS) and each respective RS.

In some embodiments, assigning the distinct PN sequence to each relay station comprises including assigned PN index, DL_PermBase, and PRBS_ID fields management messages.

In some embodiments, the method further comprises for purposes of routing, identifying each BS or RS by a BS identification (BS ID) in a MAC management message.

In some embodiments, identifying each RS comprises assigning each RS a BS ID in a management message.

In some embodiments, assigning a distinct PN sequence for a mobile relay station (MRS) is statically defined even when there is a handoff.

In some embodiments, the method further comprises defining for mobile relay stations a system reserved sub-set of PN indexes so as to avoid collisions when a MRS moves across the network.

In some embodiments, the PN index is re-assigned during a handoff, and further comprising informing any attached MSs of the change and/or performing re-synchronization.

In some embodiments, the method further comprises: performing sub-channelization using bins, wherein each bin is a band of sub-carriers in an OFDM symbol.

In some embodiments, performing sub-channelization using bins is performed in a manner consistent with 802.16e AMC sub-channelization.

In some embodiments, a bin is defined as a band of contiguous sub-carriers (G) in one OFDM symbol, with each bin including at least one pilot sub-carrier.

In some embodiments, the at least one pilot sub-carrier is: for one antenna located in the bin at a sub-carrier indexed with floor(G/2); for two antennas located in the bin at a first sub-carriers indexed with floor(G/2) for a first antenna and a second sub-carrier indexed with floor(G/2)+1 for a second antenna; and for four antennas located in the bin at a first sub-carrier indexed with floor(G/2) for a first antenna, a second sub-carrier indexed with floor(G/2)−1 for a second antenna, a third sub-carrier indexed with floor(G/2)+1 for a third antenna and a fourth sub-carrier indexed with floor(G/2)+2 for a fourth antenna.

In some embodiments, performing sub-channelization comprises forming sub-channels from contiguous sets of one or more bins over one or more consecutive OFDM symbols.

In some embodiments, the method further comprises performing DL resource multiplexing between BS and RS, between RS and RS, between BS and MS and between RS and MS on an FDM (frequency division multiplexing) basis.

In some embodiments, the method further comprises for all available sub-carriers used for pilot and data in an OFDM symbol; dividing the sub-carriers into a set of major groups; and dedicating a number of the major groups of the set of major groups to BS and RS transmission and RS and RS transmission.

In some embodiments, dividing the sub-carriers into a set of major groups and dedicating a number of the major groups is done in a manner consistent with 802.16e.

In some embodiments, a sub-channel is defined so as to enlarge sub-channel size, each sub-channel defined to consist of a set of clusters that are not contiguous.

In some embodiments, the method further comprises performing UL resource multiplexing between RS and BS, between RS and RS, between MS and BS and between MS and RS using the UL RS_Zones.

In some embodiments, the method further comprises: performing sub-channelization using bins, wherein each bin is a band of sub-carriers in an OFDM symbol.

In some embodiments, a first bin definition includes pilot symbols, and a second bin definition does not include pilot symbols, and a combination of the two bin definitions is used for a given sub-channel.

In some embodiments, the method further comprises: initially assuming an entire frame resource is initially available for use for RS related transmission (DL/UL); defining RS sub-channels; assigning resources for MSs first; then assigning resources for RSs with RS sub-channels; resources assigned to RS that are already occupied by MSs are punctured out from the assigned resource for RS.

According to an aspect of the invention, there is provided a method comprising: transmitting R-MAP information in at least one frame of a series of frames, each frame comprising multiple OFDM symbols, to indicate configuration of a transmission resource and/or assignment of a transmission resource for downlink and uplink communication between a base station and at least one relay station one hop away from the base station, or between a relay station and at least one other relay station one hop away from the relay station.

In some embodiments, transmitting the R-MAP information comprises: transmitting an indication that the information is R-MAP information, transmitting a total number of transmission resource assignment information segments included in the R-MAP information; and for each of the total number of transmission resource assignment information segments; transmitting information defining a particular configuration of a transmission resource or an assignment of the transmission resource, for at least one frame of the series of frames.

In some embodiments, transmitting R-MAP information comprises transmitting the R-MAP information in a downlink sub-frame of the at least one frame.

In some embodiments, transmitting the R-MAP information in a downlink sub-frame further comprises transmitting the R-MAP information in a downlink relay station (DL RS) zone of the downlink sub-frame.

In some embodiments, the further comprising transmitting a relay zone frame control header (R-FCH) channel prior to transmitting the R-MAP information, the R-FCH comprising a length of the R-MAP information and modulation and coding rate of the R-MAP information.

In some embodiments, transmitting information defining a particular configuration of a transmission resource or an assignment of the transmission resource comprises transmitting a relay station identifier (RSID) to identify the at least one relay station for which the assignment is being made.

In some embodiments, transmitting a relay station identifier (RSID) to identify the at least one relay station comprises: transmitting a unicast RSID for assigning a resource to a single relay station; and transmitting a broadcast RSID for assigning a resource to a more than one relay station.

In some embodiments, transmitting information defining a particular configuration of a transmission resource or an assignment of the transmission resource comprises transmitting at least one of: configuration information for defining a basic resource unit (BRU) to be assigned; configuration information for defining a region of time-frequency of the at least one frame to be assigned; assignment information for assigning at least on BRU; and assignment information for assigning at least one region of time-frequency of the at least one frame.

In some embodiments transmitting configuration information for defining a basic resource unit (BRU) to be assigned comprises transmitting: a length of the configuration information; a first OFDM symbol index indicating an index of an OFDM symbol at which a downlink relay station (DL_RS) Zone begins; a first number of OFDM symbols indicating a number of OFDM symbols which the DL_RS Zone occupies; an indication of a number of sub-channels which are included in each downlink basic resource unit (DL BRU) of the DL_RS Zone; a second OFDM symbol index indicating an index of an OFDM symbol at which an uplink relay station (UL_RS) Zone begins; a second number of OFDM symbols indicating a number of OFDM symbols which the UL_RS Zone occupies; an indication of a number of slots which are included in each uplink basic resource unit (UL BRU) of the UL_RS Zone; an indication of a number of frames before the configuration takes effect, starting from the current frame.

In some embodiments, transmitting configuration information for defining a basic resource unit (BRU) to be assigned comprises transmitting configuration information in the form of an Information Element (IE) consistent with the following format:

| Syntax | Size | Notes |
|---|---|---|
| RS Zone BRU Configuration IE { | | |
| Type | 4 bits | 0x00 |
| Length | 4 bits | Length in bytes |
| OFDM symbol index for DL_RS Zone | 8 bits | Indicates the OFDM symbol index starting a DL_RS Zone |
| Number of OFDM symbols | 4 bits | Indicates the number of OFDM symbols a DL_RS Zone occupies |
| DL BRU | 4 bits | Indicates the number of sub-channels a DL BRU includes |
| OFDM symbol index for UL_RS Zone | 8 bits | Indicates the OFDM symbol index starting a UL_RS Zone |
| Number of OFDM symbols | 4 bits | Indicates the number of OFDM symbols a UL_RS Zone occupies |
| UL BRU | 4 bits | Indicates the number of slots a UL BRU includes |
| Number of frames before effective | 4 bits | Indicates the number of frames before the configuration takes effect (starting from the current frame) |
| } | | |

In some embodiments, transmitting configuration information for defining a region of time-frequency of the at least one frame to be assigned comprises transmitting: a length of the configuration information; a first OFDM symbol index indicating an index of an OFDM symbol at which a DL_RS Zone begins; a first number of OFDM symbols indicating a number of OFDM symbols which the DL_RS Zone occupies; an indication of a number of regions defined in the DL_RS Zone; for each region of the number of regions defined in the DL_RS Zone: an indication of a number of sub-channels in the DL region; a second OFDM symbol index indicating an index of an OFDM symbol at which an UL_RS Zone begins; a second number of OFDM symbols indicating a number of OFDM symbols which the UL_RS Zone occupies; an indication of a number of regions defined in the UL_RS Zone; for each region of the number of regions defined in the UL_RS Zone: an indication of a number of slots an uplink basic resource unit (UL BRU) includes; an indication of a number of frames before the configuration takes effect, starting from the current frame.

In some embodiments, transmitting configuration information for defining a region of time-frequency of the at least one frame to be assigned comprises transmitting configuration information in the form of an IE consistent with the following format:

| Syntax | Size | Notes |
|---|---|---|
| RS Zone Region Configuration IE { | | |
| Type | 4 bits | 0x00 |
| Length | 4 bits | Length in byte |
| OFDM symbol index for DL_RS Zone | 8 bits | Indicates the OFDM symbol index starting a DL_RS Zone |
| Number of OFDM symbols | 4 bits | Indicates the number of OFDM symbols a DL_RS Zone occupies |
| Number of DL region | 6 bits | Indicates the number of regions defined in DL_RS Zone |
| For (i=0;i<Number of regions; i++){ | | |
| Number of subchannels } | 4 bits | Indicates the number of sub-channels the region includes |
| OFDM symbol index for UL RS_Zone | 8 bits | Indicates the OFDM symbol index starting a UL_RS Zone |
| Number of OFDM symbols | 4 bits | Indicate the number of OFDM symbols a UL_RS Zone occupies |
| Number of UL region | 6 bits | Indicates the number of regions defined in UL_RS Zone |
| For (i=0;I<Number of region; i++){ | | |
| Number of slots } | 4 bits | Indicates the number of slots the region includes |
| Number of frames before effective | 4 bits | Indicates the number of frames before the configuration takes effect (starting from the current frame) |
| } | | |

In some embodiments, transmitting assignment information for assigning at least on BRU comprises transmitting: a relay station identifier (RSID) indicating a particular destination relay station to which the transmission resource is assigned; an indication of a number of DL BRU assigned to an RS identified with the RSID; an indication of the modulation and coding scheme (MCS) used for the transmission resource assigned to the RS identified with the RSID; an indication of a number of UL BRU assigned to the RS identified with the RSID; an indication of the MCS used for the transmission resource assigned to the RS identified with the RSID.

In some embodiments, transmitting assignment information for assigning at least on BRU comprises transmitting configuration information in the form of an IE consistent with the following format:

| Syntax | Size | Notes |
|---|---|---|
| RS BRU Resource Assignment IE { | | |
| Type | 4 bits | 0x01 |
| RSID | 8 bits | Relay station ID |
| Number of DL BRU | 6 bits | Indicates the number of DL BRUs assigned to an RS identified by RSID |
| DL MCS | 4 bits | Indicates the modulation and coding scheme (MCS) to be used in the resource assignment for the RS identified by RSID |
| Number UL BRU | 6 bits | Indicates the number of UL BRUs assigned to an RS identified by RSID |
| UL MCS | 4 bits | Indicates the MCS to be used in the resource assignment for the RS identified by RSID |
| } | | |

In some embodiments, transmitting assignment information for assigning at least on region of time-frequency of the at least one frame comprises transmitting: a relay station identifier (RSID) indicating a particular destination relay station that the resource assignment is directed to; a DL region identifier (DL region ID) identifying a DL region assigned to the RS identified by the RSID; an indication of the MCS used for the DL region identified by the DL region ID; a UL region identifier (UL region ID) identifying a UL region assigned to the RS identified by the RSID; an indication of the MCS used for the UL region identified by the DL region ID.

In some embodiments, transmitting assignment information for assigning at least on region of time-frequency of the at least one frame comprises transmitting configuration information in the form of an IE consistent with the following format:

| Syntax | Size | Notes |
| --- | --- | --- |
| RS Region Resource Assignment IE { | | |
| Type | 4 bits | 0x01 |
| RSID | 8 bits | Relay station ID |
| DL region ID | 6 bits | Indicates an identification of a DL region assigned to an RS identified by RSID |
| DL MCS | 4 bits | Indicates the MCS to be used in the resource assignment for the RS identified by RSID |
| UL region ID | 6 bits | Indicates an identification of an UL region assigned to an RS identified by RSID |
| UL MCS | 4 bits | Indicates the MCS to be used in the resource assignment for the RS identified by RSID |
| } | | |

In some embodiments, transmitting R-MAP information comprises transmitting multiple R-MAP, each R-MAP for a respective one RS or multiple RSs with similar channel qualities.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF THE EMBODIMENTS OF THE INVENTION

In accordance with embodiments of the invention, various physical layer designs and procedures are provided for enabling relay based communications that may find applications in an IEEE 802.16 based network. The concepts described herein are not, however, limited in this regard and may be applicable to any OFDM based systems, such as 3GPP and 3GPP2 evolutions.

Figure 1:
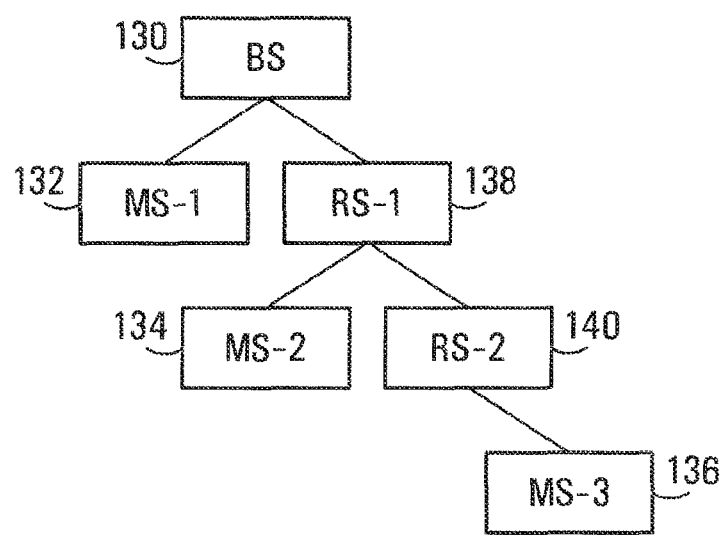
FIG. 1 is a block diagram of an example of a network including a base station, relay stations and mobile stations.

FIG. 1 shows an example of a wireless system, for example an OFDM network that includes relays. Shown is a base station (BS) 130 that is in communication with one or more mobile stations (MS), only one shown MS-1 132, and one or more first tier relay stations (RS), only one shown RS-1 138. Some of the first tier (one hop away from BS) relay stations are in communication with one or more second tier (two hops away from BS) relay stations. RS and MS the same number of hops away from the BS are said to be in the same tier. In the illustrated example RS-1 138 is in communication with second tier RS-2 140. Each relay station can serve one or more mobile stations. For example, RS-1 138 is in communication with MS-2 134 and RS-2 140 is in communication with MS-3 136. In the particular example, there is a two-tier relay structure, such that there is a maximum of three hops to reach a mobile station. Larger numbers of hops are contemplated. Furthermore, the specific network of FIG. 1 is to be considered only an example. More generally, an arbitrary arrangement of base stations, relay stations, and mobile stations is contemplated. The mobile stations will change over time due to their mobility. Some embodiments support only fixed relays; others support mobile relays, while further embodiments support both fixed and mobile relays.

Figure 2:
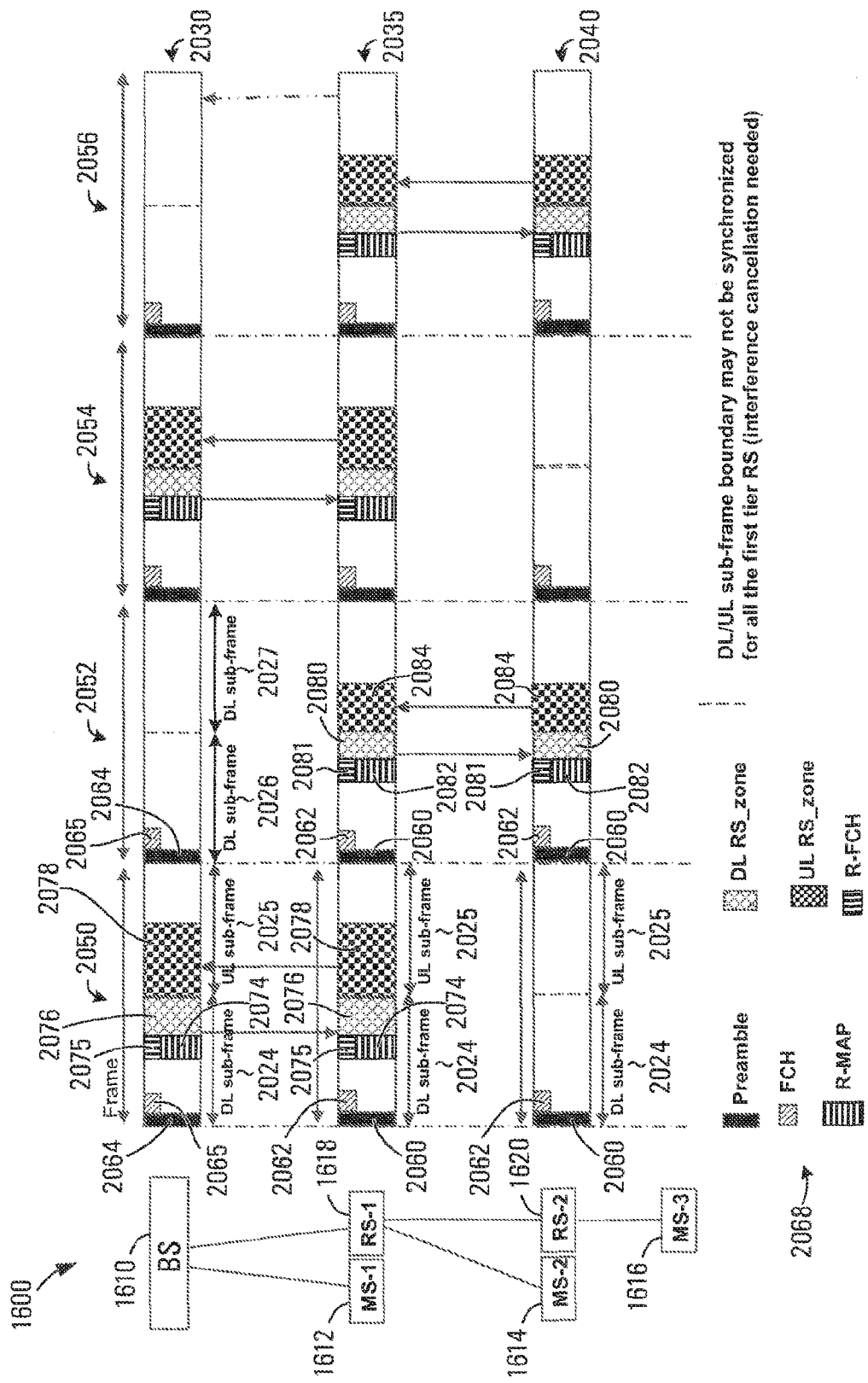
FIGS. 2 and 3 are schematic diagrams of frame structures provided by embodiments of the invention.

Referring to FIG. 2, shown is a specific frame structure for handling the presence of relays in an OFDM communication system. FIG. 2 also includes an example of a network 1600 including relay stations RS-1 1618 and RS-2 1620, base station BS 1610 and mobile stations MS-1 1612, MS-2 1614 and MS-3 1616, similar to FIG. 1 to clearly illustrate the correspondence of the frame structure to the base station BS and relay stations RS-1 and RS-2.

In FIG. 2, the horizontal direction of the frame structure is time, representing multiple OFDM symbols, while the vertical direction is frequency, representing multiple OFDM sub-carriers. In the first row 2030, communication from the perspective of BS 1610 is shown; in the second row 2035, communication from the perspective of a first tier relay station RS-1 1618 is shown; in the third row 2040, communication from the perspective of a second tier relay station RS-2 1620 is shown. In the time direction, frames are defined, each consisting of multiple OFDM symbols. FIG. 2 is an example of four sequential TDD frames in a potential series of frames in which a respective DL sub-frame and a respective UL sub-frame have been combined together to form each of the two TDD frames.

In the embodiment illustrated in FIG. 2, a DL/UL (downlink/uplink) duplex structure is employed. Each frame 2050, 2052,2054,2056 includes a DL sub-frame 2024,2026 used for DL communication and a UL sub-frame 2025,2027 used for UL communication. The size of these sub-frames can be statically or dynamically defined. In FIG. 2 both sides of a communication are shown. More specifically, a portion of a frame used to transmit from a first entity, for example BS 1610, to a second entity, for example RS-1 1618, is shown in both the frame structure 2030 for BS 1610 and the frame structure 2035 for RS-1 1618.

The frames are divided into first and second groups of frames. In the illustrated example, the first group is the odd frames 2050,2054 and the second group is the even frames 2052,2056 but other definitions are possible. In FIG. 2, the first group of frames is used for UL and DL communication between BS 1610 and its first tier RSs (RSs one-hop away from BS), for example RS-1 1618 and for communications (not shown) between the BS 1610 and MS directly served by the BS, for example MS-1 1612.

In addition, in some embodiments, the first group of frames is also used for communication between the second tier RSs (two-hops away from the BS), for example RS-2 1620, and MS associated with the second tier RSs, for example MS-3 1616. While it is not shown, in some embodiments RS-2 1620 may communicate with a third tier RS as well as MS-3 1616. This assumes interference from transmissions from the BS will not significantly effect transmissions from second tier RSs.

In FIG. 2, the second group of frames 2052,2056 is used for UL and DL communication between the first tier RS RS-1 1618 and any RS/MS it is communicating with. This would include, for example, communications between RS-1 and RS-2 1620, and communications between RS-1 and MS-2 1614 (not shown).

In some embodiments, the BS 1610 is also permitted to communicate during the second group of frames with mobile stations where the power of the transmissions is controlled. For example, the power of the transmission may be at a reduced power level with mobile stations that are closer to the base station, so as not to interfere with the relay communications.

In some embodiments, the RSs are also permitted to communicate with MSs during either the first or second groups of frames where the power of the transmissions is controlled. For example, as indicated in FIG. 2, when a first tier RS 1618 is scheduled to communicate with a BS 1610 during a first group of frames 2050 and is scheduled to communicate with a second tier RS 1620 and with at least one MS 1614 communicating with the first tier RS 1618 during a second set of frames 2052, the first tier RS 1618 can also communicate with the at least one MS 1614 communicating with the first tier RS 1618 during the first set of frames 2050 as well. This communication occurs in the first and second groups of frames in a portion of the respective frames assigned for DL and UL communication with MSs.

In some embodiments, in order to ensure backwards compatibility with MS that support 802.16e, each RS, after network entry, transmits a preamble 2060 and a frame control header (FCH) channel 2062 on every frame as shown.

In systems that do not use relay stations, the BS transmits a preamble that is used by mobile stations to measure radio propagation environment and enable MS cell selection. In 802.16e, this preamble is transmitted at the start of every DL sub-frame. In the illustrated example of FIG. 2 the preamble is identified by reference character 2064. The preamble is followed by the FCH channel, identified in FIG. 2 by reference character 2065. The FCH provides initial information about the contents of the DL and/or UL sub-frames. For example, the FCH may contain information about the size of the MAP information following the FCH. When relay stations are present, they also transmit such a preamble in a similar manner so that MS cell selection can be performed as before. This preamble is referred to as a "normal preamble". A problem with this approach is that an RS needs to be able to look at a received preamble and transmit a preamble at the same time. An embodiment of the invention provides a method of a preamble transmission by the RS that enables RS radio environment measurement without interrupting MS cell selection.

In a particular implementation, a new preamble, referred to as an RS_preamble since it is transmitted by the RS only and not the BS, is transmitted in every Nth frame, where $N \geq 1$, once the RS enters the network. In some embodiments, the RS_preamble is transmitted in addition to the normal preamble. In some embodiments, frames are as defined in 802.16e, but other frame definitions are contemplated.

In some embodiments, the RS_preamble is transmitted within a UL sub-frame for TDD implementations or a UL sub-frame for FDD implementations. Note this is in contrast to the normal preamble that is transmitted during the DL sub-frame. A pseudo-random noise (PN) sequence for each respective RS preamble may be the same as that of an assigned normal preamble or the PN sequence may be different.

The RS's transmission and receiving of this RS_preamble is synchronized so that at each RS_preamble transmission time, RSs that need to listen to preambles are not transmitting preambles at the same time as they are receiving the preambles. For example, first tier RSs can simultaneously transmit their preambles during a first preamble transmission period, and second tier RSs can monitor these; similarly, second tier RSs can simultaneously transmit their preambles during a second preamble transmission period, and first and/or third tier RSs when present can monitor these. In a particular example, first tier RSs transmit their preamble during odd UL sub-frames or UL frames, and second tier RSs transmit their RS_preamble during even UL sub-frames or UL frames.

In some embodiments RS_preamble reuse within a cell is employed.

In some embodiments, for the multiple carrier case such as the example of FIG. 2, a common channel is defined as a primary channel for transmitting an RS_preamble for each respective RS to determine a radio environment measurement. The radio environment measurements are used to, for example establish topology, transmit broadcast traffic and RS related control messages, and negotiate or declare the transmission and receiving schedule on another channel.

In some embodiments, having defined the first and second groups of frames, RS Zones are defined in the time domain to enable more efficient sub-channelization. More specifically, a DL_RS Zone is defined for downlink transmission (from a base station or a relay to another relay) and a UL_RS Zone is defined for uplink transmission (from a relay to another relay, or from a relay to BS. Remaining resources are available for communication with mobile stations. For example the DL sub-frame may include a DL_MS zone having a set of one or more OFDM symbols specifically targeted for reception by one or multiple MS and the UL sub-frame may include a UL_MS zone having a set of one or more OFDM symbols for receiving from one or multiple MS.

In the illustrated example of FIG. 2, four TDD frames 2050,2052,2054,2056 are shown. Only TDD frames 2050 and 2052 will be described in detail. TDD frame 2050 is composed of DL sub-frame 2024 during which downlink transmissions from the BS 1610 occur and a UL sub-frame 2025 during which uplink transmissions to the BS 1610 occur. Similarly, TDD frame 2052 is composed of DL sub-frame 2026 during which downlink transmissions from first tier RS 1618 occur and a UL sub-frame 2027 during which uplink transmissions to second tier RS 1620 occur. A legend indicating differing shadings for the differing zone types is generally indicated at 2068.

During the DL sub-frame 2024, the frame structure 2030 for the BS 1610 includes the preamble 2064 and FCH 2065. In some embodiments, the FCH is consistent with 802.16e. The frame structure 2030 includes a DL_RS zone 2076 that includes a relay station R-MAP 2074 for transmission to relay stations such as RS-1 1618. The DL_RS zone 2076 may also include a relay station frame control header (R-FCH) channel 2075 that contains frame control header information specifically for the DL and UL_Zones, for example modulation and coding scheme information pertaining to the R-MAP. The DL sub-frame 2024 of frame structure 2030 may also include a DL_MS zone (not shown) for transmission directly to mobile stations such as MS-1 1612.

During the DL sub-frame 2024, the frame structure 2035 for the RS-1 1618 includes a preamble 2060 and FCH 2062. In some embodiments the preamble is the RS_preamble described above. In the illustrated example, an area of the DL sub-frame 2024 in frame structure 2035 is shown for receiving the DL-RS zone 2076 that includes the R-MAP 2074. An area is also shown for receiving the R-FCH 2075. The DL sub-frame 2024 of frame structure 2035 may include a DL_MS zone (not shown) for transmission directly to mobile stations such as MS-2 1614 as well as RS radio switching periods (not shown). During the radio switching periods, the RS switches its radio from transmitting to receiving or vice versa.

During the DL sub-frame 2024, the frame structure 2040 for the RS-2 1620 includes a preamble 2060 and FCH 2062. The DL sub-frame 2024 of frame structure 2040 may include a DL_MS zone (not shown) for transmission directly to mobile stations such as MS-3 1616. There may also be RS radio switching periods.

During the UL sub-frame 2025, the frame structure 2030 for the BS 1610 includes an area of the UL sub-frame 2025 for receiving UL_RS zone 2078 transmissions from relay stations such as RS-1 1618. The UL sub-frame 2025 of frame structure 2030 may also include a UL_MS zone (not shown) for receiving from mobile stations such as MS-1 1612.

During the UL sub-frame 2025, the frame structure 2035 for the RS-1 1618 includes the UL_RS zone 2078 for transmission from relay stations such as RS-2 1620. The UL sub-frame 2025 of frame structure 2035 may also include a UL_MS zone (not shown) for receiving from mobile stations such as MS-2 1614. There may also be RS radio switching periods.

During the UL sub-frame 2025, the frame structure 2040 for the RS-2 1620 may include a UL_MS zone (not shown) for receiving from mobile stations such as MS-3 1616.

During the DL sub-frame 2026, the frame structure 2030 for the BS 1610 includes a preamble 2064 and FCH 2065. The DL sub-frame 2026 of frame structure 2030 may also include a DL_MS zone (not shown) for transmission directly to mobile stations such as MS-1 1612.

During the DL sub-frame 2026, the frame structure 2035 for the RS-1 1618 includes a preamble 2060 and FCH 2062. The frame structure 2035 includes a DL_RS zone 2080 that includes an R-MAP 2082 for transmission to relay stations such as RS-2 1620. The DL_RS zone 2080 may also include an R-FCH 2081. The DL sub-frame 2026 of frame structure 2035 may include a DL_MS zone (not shown) for transmission directly to mobile stations such as MS-2 1614 as well as RS radio switching periods.

During the DL sub-frame 2026, the frame structure 2040 for the RS-2 1620 includes a preamble 2060 and FCH 2062. In the illustrated example, an area of the DL sub-frame 2026 in frame structure 2035 is shown for receiving the DL_RS zone 2080 that includes the R-MAP 2082. An area is also shown for receiving the R-FCH 2081. The DL sub-frame 2026 of frame structure 2040 may include a DL_MS zone (not shown) for transmission directly to mobile stations such as MS-3 1616. There may also be RS radio switching periods.

During the UL sub-frame 2027, the frame structure 2030 for the BS 1610 may include UL_MS zone (not shown) for receiving from mobile stations such as MS-1 1612.

During the UL sub-frame 2027, the frame structure 2035 for the RS-1 1618 includes an area of the UL sub-frame 2027 for receiving a UL_RS zone 2084 from relay stations such as RS-2 1620. The UL sub-frame 2027 of frame structure 2035 may also include UL_MS zone (not shown) for receiving from mobile stations such as MS-2 1614. There may also be RS radio switching periods.

During the UL sub-frame 2027, the frame structure 2040 for the RS-2 1620 includes a UL_RS zone 284 for transmitting to relay stations, such as RS-1 1618. The UL sub-frame 2027 of frame structure 2040 may also include a UL_MS zone (not shown) for receiving from mobile stations such as MS-3 1616.

Corresponding zones for transmitting/receiving are defined in the first frame 2050 for the first tier RS RS-1 1618 and the BS 1610 in frame structures 2030,2035. During this time, the second tier relay RS-2 1620 is only communicating with MS, for example MS-3 1616, so no zones are defined. Similar zones are defined for communication between RS-1 1618 and RS-2 1620 during each of the second group of frames 1652, including the second and fourth frames 2052, 2056 in frame structures 2035,2040.

The size of the RS Zone and a starting location of the RS zone in time-frequency within a frame can be defined for example by a) a fixed size, b) slowly changed in size through use of a management MAC message, and c) dynamically changed in size and forecast by BS and DL transmitting RSs a few frames before the change.

Figure 15:
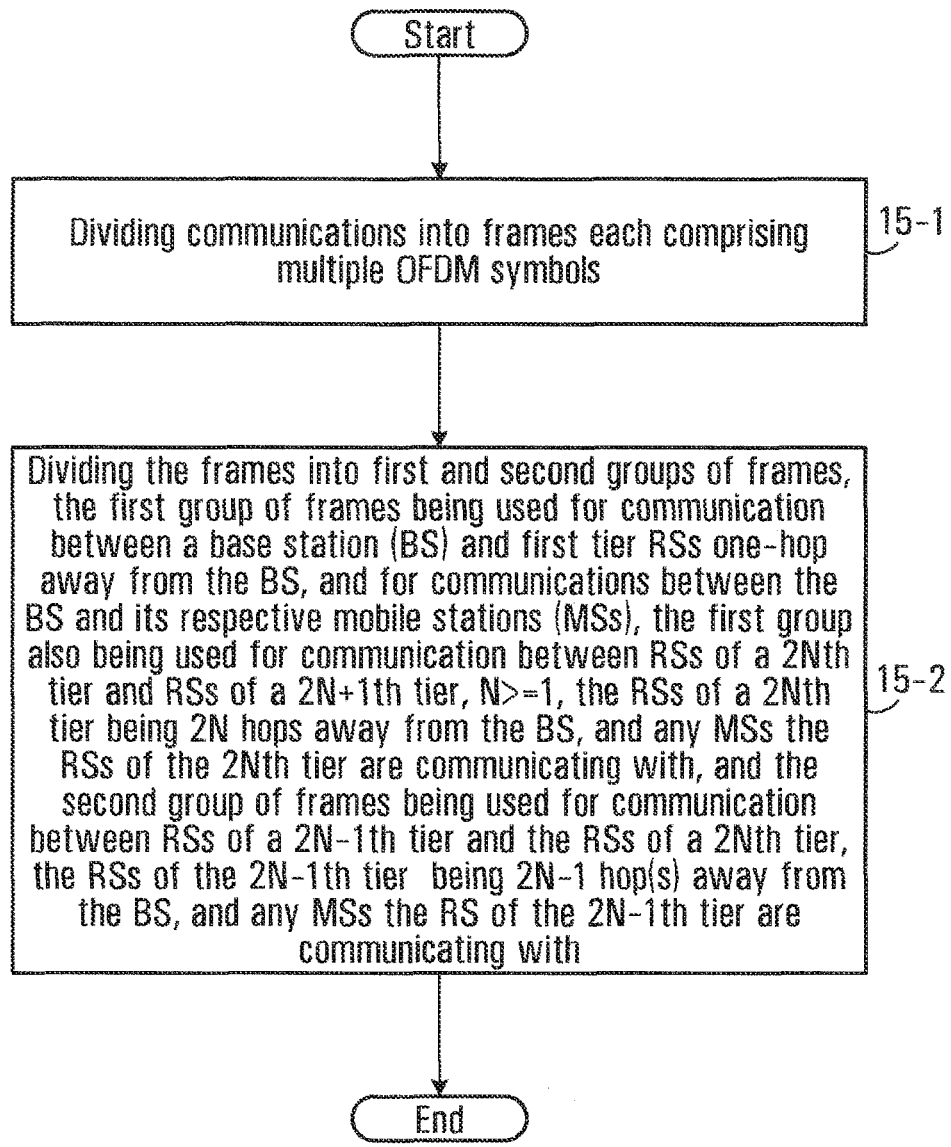
FIG. 15 is a flow chart describing a method of transmitting frames in an OFDM system including relay stations according to an embodiment of the invention.

A general method for use in an OFDM communication system employing relay stations according to some embodiments of the invention will be described with reference to FIG. 15. A first step 15-1 in the method includes dividing communications into frames each comprising multiple OFDM symbols. A second step 15-2 in the method includes dividing the frames into first and second groups of frames, the first group of frames being used for communication between a base station (BS) and first tier RSs one-hop away from the BS, and for communications between the BS and its respective mobile stations (MSs), the first group also being used for communication between RSs of a 2Nth tier and RSs of a 2N+1th tier, N>=1, the RSs of a 2Nth tier being 2N hops away from the BS, and any MSs the RS of the 2Nth tier is communicating with, and the second group of frames being used for communication between RSs of a 2N−1th tier and the RSs of a 2Nth tier, the RSs of the 2N−1th tier being 2N−1 hop(s) away from the BS, and any MSs the RS of the 2N−1 tier is communicating with.

Some embodiments provide for the reuse of OFDM symbols in multiple zones. Some embodiments provide for reuse between different tiers, while others provide for reuse within a tier. An example of reuse between different tiers in a hierarchical network is a BS transmitting during OFDM symbol intervals, and an RS transmitting on the same OFDM symbol intervals assuming the transmissions will not interfere. Another example of reuse between different tiers in a hierarchical network is an RS transmitting during OFDM symbol intervals, and an RS in a different tier transmitting on the same OFDM symbol intervals assuming the transmissions will not interfere.

An example of reuse within a tier in a hierarchical network is an RS transmitting during OFDM symbol intervals, and another same tier RS transmitting on the same OFDM symbol intervals assuming the transmissions will not interfere.

DL Preamble Transmission

In some embodiments, DL preambles are used to transmit PN codes in a manner consistent with current 802.16e definitions. These provide for a total of 114 PN sequences (57×2) and 32 IDcell definitions. In some embodiments, each transmitting station (BS and RS) is physically differentiated within a geographic area by a respective distinct preamble PN sequence for switching purposes. Each respective preamble PN sequence implies a particular IDcell. Thus, each RS is assigned a dedicated PN sequence. This enables a preamble sequence space reuse that is larger than what 802.16e defines. The preamble can be transmitted within the network synchronized in a manner to enable serving station selection.

In some embodiments, the 802.16e standard is adapted to be used in this manner by modifying management messages to be used by the relay station when it enters the network. In some embodiments, the management messages are REG-REQ/RSP (registration request/response) messages. For example, the REG-REQ/RSP messages can be modified to include an assigned PN index information field, a DL_PermBase information field, and a PRBS_ID information field. DL_PermBase and PRBS_ID are index numbers used for data randomizations in the 802.16e standard. They are essentially linked to the Base station ID to ensure that each base station randomizes data in different manner. Specifically, DL_PermBase is used in relation to physical sub-channel to logical sub-channel mapping and PRBS_ID is used in relation to data scrambling.

In some embodiments, an algorithm is employed to perform PN index selection. The algorithm selects and assigns to an RS the PN index selection to minimize IDcell collision. The algorithm also may assign DL_PermBase and PRBS_ID values.

For the purpose of routing, a station (BS and RS) is identified by a BS ID (base station identification) in a MAC management message. For this purpose, each RS is assigned a BS ID (48 bits). In some embodiments, the 802.16e standard is adapted to be used in this manner by modifying the REG-REQ/RSP to include the assigned BS ID.

Various options exist for PN assignment for a mobile relay station (MRS) preamble. In some embodiments, the preamble PN index does not change during handover of an MRS from a BS serving first cell to a BS serving a second cell as the MRS moves between the first and second cells. This involves defining a system reserved for a sub-set of PN indexes for the MRS so as to avoid collision when the MRS moves across the network. In some embodiments, the preamble is changed or re-assigned during handover, and no PN needs to be reserved for the MRS. In this case, the MSs associated with the MRS need to be informed of the change or they must perform re-synchronization. In a particular example, this is achieved by modifying a message, such as a mobile handoff message response (MOB_MSHO_RSP) to include a preamble PN index.

RS 802.16e Preamble Transmission

In some embodiments, each RS is configured to transmit a preamble to facilitate a MS to perform cell selection and handoff, as well as to potentially aid in other functionality. A specific example of such a preamble is that specified by 802.16e, but others may be used. In the example that follows, 802.16e preambles are assumed, but similar preamble re-use can be applied to any finite preamble resource. With preambles based on 802.16e-2005, there are a total of 114 preambles (identified by preamble as characterized by IDcell, segment and PN sequence) for 1024 mode and 512 mode. This preamble resource pool is shared between base stations and the RSs which are configured to transmit 802.16e preamble.

Preamble Selection

During RS initial network entry, an RS performs the cell selection in a similar manner that a MS does. In some embodiments, this procedure is enhanced to enable the RS assistance in preamble PN sequence selection.

To begin, the RS maintains information identifying a set of possible preambles for use in the system to be measured. In an example approach to achieving this, the relay station maintains preamble information consisting for example of an entry for each preamble with each entry having a preamble index corresponding to the PN sequence. The RS measures the strength of each of the possible preambles and records the strength of each. The strength of each preamble may be recorded in a table for the corresponding entry. The longer the time taken for this measurement, the more the impact of fading will be minimized. When the measurement procedure is finished, for example when some number of frames has been measured, the RS determines its serving station (a base station or possibly another relay station) based on these measurements. The particular criteria here are not relevant and any method of cell selection can be employed.

Having performed cell selection, preamble selection is performed to select the preamble that will be transmitted by the relay station. In some embodiments, the RS uses the strength information to determine a candidate preamble pool for the purpose of a preamble selection. In some embodiments, the candidate preambles in the candidate pool are those preambles whose strengths measured by this RS are lower than a pre-defined threshold. More complicated selection procedures are also contemplated; for example any preamble below a first threshold up to some number and any preamble below a second threshold up to some number and so on; the lowest N below a particular threshold, etc. The RS then selects one preamble from the candidate pool and reports this back to its serving base station, either directly or via other relay stations. More generally, the RS may select some number M of preambles and indicate these to its serving base station. The selected preambles can be indicated by the preamble index. The base station may agree or deny a single selected preamble. In some implementations, the base station signals a determination of one or more preambles to the relay station. In some embodiments, multiple preambles are selected by the relay station, and the base station signals a selection of one of these.

In some embodiments, preamble selection is cooperative in that both the relay station and the base station participate. To begin, the RS reports preamble measurement information to its BS. This may for example contain a list that includes all the preamble indexes whose strength measured by the RS are higher and/or lower than a pre-defined threshold, but other information may alternatively be fed back to the BS.

The BS assigns a preamble based on the information from the list reported by this RS, for example by selecting one on the list or one not on the list depending on what is fed back. In some embodiments, the BS takes into account other available information such as what preamble(s) are currently in use within the cell and in use in neighbouring cell(s), assuming this information is made available by neighbour BSs. Such information may be made available for example through backhaul connections.

Advantageously, by reasonable setting of threshold and measurement time, preamble collision (multiple devices attempting to use the same preamble in an overlapping coverage region) can be reduced, and the need for a complex preamble plan can be avoided.

In an example implementation, a Config-REQ/RSP MAC management message utilized. In the Config-REQ/RSP MAC management message the 4 bit reserved field is replaced with "RS_Zone Prefix location" The "RS_Zone Prefix location" indicate the OFDM symbol index relative to the beginning of current frame in units of 2 OFDM symbols.

In some embodiments, preamble strength measurement information, made available by mobile stations and/or relay stations is used by the base station to perform resource re-allocation. To begin, mobile stations report the strengths of preambles transmitted by relays, and more generally the strength of all the preambles that it can measure. In some embodiments, a mobile station may not necessarily distinguish between a preamble transmitted by a BS and a preamble transmitted by an RS and reports the signal strength of both. However, when a BS receives the signal strength measurements it knows which measurement is for the BS preamble and which measurement is for the RS preamble. The BS then uses this information to intelligently perform resource re-use between the relay stations. For example, when a MS reports negligible strength of a preamble transmitted by a one RS and good signal strength from a second RS, the signals transmitted by that first and second RSs may not interfere with each other and as such resources that are in use by the neighbouring base station. Examples of resources that can be allocated in this manner include resources within OFDM frames—for example particular sub-carriers over particular OFDM symbols or frames.

In a specific example of performing resource re-use based on the strength measurements, if a first MS reports a good signal strength from a first RS and poor signal strength from a second RS, and a second MS reports a good signal strength from the second RS and poor signal strength from the first RS, then the same or at least partially overlapping resources, can be assigned at the first and second RS for transmitting to the first and second MS with the understanding that this will not result in interference.

More generally, resources can be allocated at a first relay station to the mobile station that are also being allocated at a second relay station whose preamble signal strength measurement is s below a defined threshold.

The embodiment described above, and the specific example thereof shown in FIG. 2 all assume a TDD separation between DL and UL transmissions. Further embodiments are provided that parallel the embodiments described with the exception that the separation between DL and UL transmission uses FDD. All of the examples described above also can be modified to this context; the only difference is that rather than having UL sub-frames and DL sub-frames that are transmitted during separate time intervals, UL frames and DL frames are simultaneously transmitted, but on different frequencies.

R-MAP

In some embodiments, an R-MAP is transmitted to indicate the transmission resource configurations and assignments for the DL_RS zone and/or the UL_RS zone. In some embodiments, the R-MAP is transmitted by each DL transmitting BS and RS in one or more DL sub-frames.

In some embodiments, transmitting an R-MAP in a frame includes transmitting information regarding transmission resource assignment for relay stations one hop away from the station transmitting the R-MAP. Transmission resource assignment information transmitted for each relay station one hop away includes one or more of: identification information to identify the relay station the resource assignment information is directed to; transmission resource configuration information to determine how the transmission resource is configured; transmission resource location information to identify a location in the frame of the transmission resource; transmission resource size information to identify a size of the transmission resource; and modulation and code scheme (MCS) information for the respective transmission resources. In some embodiments, location information is provided in the form of a fixed offset relative to the beginning of a frame. In some embodiments, location information is provided in the form of a fixed offset relative to the RS Zone.

Multiple R-MAPs may be transmitted, in which each respective R-MAP includes resource assignments for one or more RS sharing similar channel qualities.

RS DL Resource Allocation Methods

The RS DL resource is a transmission resource used for communication from a BS to an RS and from an RS to its next hop RS. In some embodiments, when the RS is forwarding traffic for multiple MSs (aggregated traffic), the aggregated traffic presents a less bursty nature than traffic dedicated to a single MS. As such, the traffic pattern is similar to a connection-oriented connection. Furthermore, since many RSs have a fixed position, a change in channel conditions from the BS to RS and RS to next hop RS may be less frequent than that of a BS to MS or RS to MS, and the channel may remain unchanged for a duration that is longer than a duration of a frame, for example a frame duration defined by 802.16e. Because of these distinctions, a resource assignment mechanism can be different from that currently supported by 802.16e for MS.

In some implementations, a persistent DL RS related resource assignment mechanism is employed. With such a mechanism, a BS or an RS can assign a DL resource to its next hop RS for a period of time longer than a frame, a frame being the nominal period for assignment, for example according to current 802.16e specifications. The resource assignment can be updated from time to time. Variables of the resource assignment include, for example, a target relay station identifier (RSID) and any one or more of resource size, resource location and MCS. In some embodiments, the resource assignment can be supplemented beyond an existing persistent resource assignment from time to time. The resource can also be terminated when appropriate, such as when the resource is no longer needed.

In some implementations, the RS is assigned a dedicated feedback channel for a period of time. The feedback channel may be present every N frames where N is a number greater than or equal to one. The feedback channel can be used for various purposes. For example, the RS may use this feedback channel to send a channel quality indicator, a feedback header or a BW (bandwidth) request periodically.

The following type of messaging can be employed to implement the above method, but other implementations are possible.

The R-MAP in the RS Zone is used for a parent station to signal a resource assignment in the RS Zone to a next hop relay station. This includes, for example, BS to RS and RS to next hop RS.

In order to define an efficient resource assignment for a relay station, the difference between the assignment to RS and to MS is identified. In some embodiments, each RS is addressed by a relay station identifier (RSID), having a fixed length in bits, which is shorter in number of bits than a connection identifier (CID) used to identify a connection between BS and MS.

Generally speaking, RS traffic is less bursty and an amount of traffic is larger than that of a MS due to the fact that the traffic of an RS is aggregated traffic of multiple MSs. Resource allocation for an RS can include either one of or both of DL and UL assignments. Resource granularity may be larger than a single sub-channel (for downlink transmission) and/or a single slot (for uplink transmission), as described above. Methods for defining a resource configuration will be described in further detail below.

In some embodiments, the R-MAP is implemented without defining a separate DL R-MAP and a separate UL R-MAP in the respective RS DL and RS UL zones.

In some embodiments, the R-MAP can be used for unicast resource assignment by using a unicast RSID and/or a broadcast resource assignment by using a broadcast RSID.

A resource is assigned using basic resource units (BRUs), which may be a single sub-channel (for downlink), a single slot (for uplink), multiple sub-channels or multiple slots. The BRU configuration definition can be a broadcast within the R-MAP, for example an RS Zone configuration information element (IE) described in further detail below.

In some embodiments, unicast resource assignment information having a format as concise as possible is defined to reduce unnecessary overhead. In some embodiments, a fixed length. IE is used, as will be described in examples below.

The R-MAP can use a similar format used for DL MAP and UL MAP formats as defined in IEEE802.16e-2005. However, this is not very efficient since some fields in the DL MAP and UL MAP formats are redundant.

The R-MAP can be used to signal the resource assignments and other control information included in the relay zones transmitted by the BS or RS. In some embodiments, the R-MAP is sent in the first transmitted RS_DL Zone. In some embodiments, the message is preceded by an R-FCH (Relay frame control header). Information such as the length of the R-MAP message and modulation and coding rate are indicated in the R-FCH. In some embodiments, the message is not preceded by a MAC header and message field type.

In some embodiments, the R-MAP message may transmit transmission resource assignment information segments defining resource assignment information. The R-MAP may information such as the length of the R-MAP and for each transmission resource assignment information segment transmitted in the R-MAP, an indication of the type of information and what the information is. For example, a transmission resource assignment information segment may be downlink MAP information, uplink MAP information and/or relay station link (R-link) specific information. In some embodiments, the respective transmission resource assignment information segments are transmitted in the form of an information element (IE). An information element is a portion of a message used to provide information to a relay station receiving a transmission on the transmission resource. Table 1 illustrates an example of an R-MAP message format with particular field sizes and field contents.

TABLE 1

An example of an R-MAP message format

| Syntax | Size | Notes |
| --- | --- | --- |
| R-MAP format { | | |
| Length | 11 bits | Length of R-MAP |
| For (i= 0; i<Number of IEs; i++) { | | For each IE of a total number of IEs |
| IE type | 2 bits | 0b00: DL MAP IE |
| | | 0b01: UL MAP IE |
| | | 0b10: R-link specific IE |
| | | 0b11: reserved |
| If (IE type = = 00) { | | |
| DL MAP IE } | Variable | |
| Elseif (IE type = = 01){ | | |
| UL MAP IE} | Variable | |
| Elseif (IE type = = 10) { | | |
| R-link specific IE } | Variable | |
| } | | |
| } | | |

In the example of Table 1, an IE type is indicated by a two bit value as one of a DL MAP IE, a UL MAP IE, or an R-link specific IE. For example, each IE in the R-MAP is identified as one of the three types. As indicated above the DL and UL MAP formats are not as efficient as the R-link specific format. Particular examples of R-link specific formats are formats such as found in Tables 4-7 below.

In some embodiments, a message can be designated to be an R-MAP message by sending an indication in the message that identifies the message is an R-MAP message. For example, a pre-defined message type can be assigned for identifying an R-MAP message. Such a message type value is implementation specific and could be any accepted value known by the BS, RS and MS. In some of the following examples the message type value of 67 indicating an R-MAP message will be used for example purposes.

TABLE 2

R-MAP message type

| Type | Message name | Message description |
|---|---|---|
| 67 | RS_MAP | Resource assignment message transmitted in RS_Zone |

An R-MAP message format may include transmitting: an indication that the type of message is an R-MAP message; a number of IEs included in the message and for each of the number of IEs; and an IE defining a particular resource configuration or resource assignment. In some embodiments, the R-MAP message is sent within the DL_RS Zone, for example as described above with regard to FIG. 2. A further example of an R-MAP message format is shown in Table 3.

TABLE 3

Another example of an R-MAP message format

| Syntax | Size | Notes |
|---|---|---|
| R-MAP format { | | |
| Message type = 67 | 8 bits | |
| Number of IEs | 4 bits | Indicates the number of IEs included |
| For (I = 0; Number of IEs; I++){ | | |
| R-MAP IE | Variable | |
| } | | |
| } | | |

Utilizing an R-MAP message can generally be described as a method of transmitting R-MAP information in at least one frame of a series of frames, each frame comprising multiple OFDM symbols, to indicate configuration of a transmission resource and/or assignment of the transmission resource for downlink and uplink communication between a base station and a relay station one hop away from the base station or between a relay station and a next hop relay station.

Figure 16:
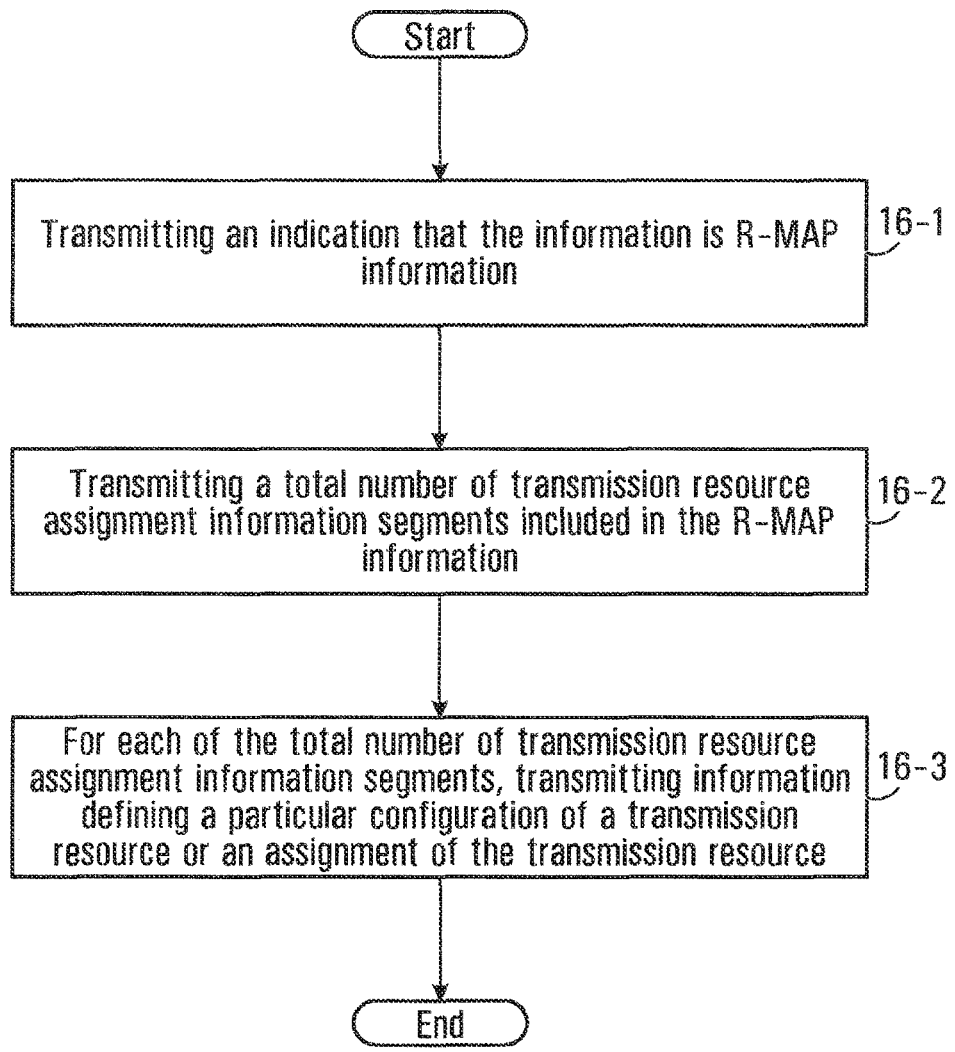
FIG. 16 is a flow chart describing a method of transmitting R-MAP information according to an embodiment of the invention.

A particular example of transmitting R-MAP information will be described with regard to FIG. 16. A first step 16-1 of the method of FIG. 16 includes transmitting an indication that the information is R-MAP information. A second step 16-2 of the method includes transmitting a total number of transmission resource assignment information segments included in the R-MAP information. A third step 16-3 of the method includes, for each of the total number of transmission resource assignment information segments, transmitting information defining a particular configuration of a transmission resource or an assignment of the transmission resource, for at least one frame of the series of frames.

Examples of various R-MAP IE formats that may be included in the R-MAP message will now be described. Tables 4 and 5 below are examples of IEs that define the configuration or size of the BRUs and regions, respectively in the DL and UL_RS Zones. Tables 6 and 7 are examples of IEs that define the resource assignment of the DL and UL_RS Zones.

RS_Zone Basic Resource Unit (BRU) Configuration IE

The RS Zone BRU configuration IE is used for a parent station to broadcast to one or more next hop RS the RS Zone related zone configuration information valid for an Nth frame count from the current frame. These configurations include the locations of DL_RS Zone and UL_RS Zone with each respective frame and the BRU definition within each of the DL and UL_RS Zones. The corresponding BRU assignment IE (for example Table 6) uses a BRU as a basic RS resource assignment unit. Table 4 illustrates an example of an RS Zone BAU Configuration IE format with particular field sizes and field contents.

TABLE 4

RS Zone BRU Configuration IE format

| Syntax | Size | Notes |
|---|---|---|
| RS Zone BRU Configuration IE { | | |
| Type | 4 bits | 0x00 |
| Length | 4 bits | Length in bytes |
| OFDM symbol index for DL_RS Zone | 8 bits | Indicates the OFDM symbol index starting a DL_RS Zone |
| Number of OFDM symbols | 4 bits | Indicates the number of OFDM symbols a DL_RS Zone occupies |
| DL BRU | 4 bits | Indicates the number of sub-channels a DL BRU includes |
| OFDM symbol index for UL_RS Zone | 8 bits | Indicates the OFDM symbol index starting a UL_RS Zone |
| Number of OFDM symbols | 4 bits | Indicates the number of OFDM symbols a UL_RS Zone occupies |
| UL BRU | 4 bits | Indicates the number of slots a UL BRU includes |
| Number of frames before effective | 4 bits | Indicates the number of frames before the configuration takes effect (starting from the current frame) |
| } | | |

The "Type" and "Length" fields indicate the length in bytes of the IE and the type of IE it is, for example an RS Zone BRU Configuration IE, as opposed to, for example, one of the other types of IE described below.

The "OFDM symbol index for DL_RS Zone" field indicates an index of the OFDM symbol at which the DL_RS Zone begins. The first "Number of OFDM symbols" field indicates a number of OFDM symbols which the DL_RS Zone occupies. The "DL BRU" field indicates a number of sub-channels which a DL basic resource unit (DL BRU) includes. The "OFDM symbol index for UL_RS Zone" field indicates an index of the OFDM symbol at which the UL_RS Zone begins. The second "Number of OFDM symbols" field indicates a number of OFDM symbols which the UL_RS Zone occupies. The "UL BRU" field indicates a number of slots a UL basic resource unit (UL BRU) includes. The "Number of frames before effective" filed indicates a number of frames before the configuration takes effect, starting from the current frame.

The size of each of the fields in Table 4 is indicated in bits. It is to be understood that the field size is implementation specific and the provided size is merely for example purposes.

The RS Zone BRU configuration may be particularly effective when each BRU includes groupings of physical or logical sub-channels that have the same number of sub-channels. However, in some embodiments, it may be beneficial to have a configuration definition in which different regions in the DL or UL resource have different respective numbers of sub-channels. An example of providing such a configuration is the RS Zone Region Configuration IE described below.

RS Zone Region Configuration IE

The RS Zone Region Configuration IE is used for a parent station to broadcast to one or more next hop RS the RS Zone related configurations valid for an Nth frame count from the current frame. The configurations include the locations of DL_RS Zone and UL_RS Zone and the region definition within each of DL and UL_RS Zone. Table 5 illustrates an example of an RS Zone Region Configuration IE format with particular field sizes and field contents.

TABLE 5

RS Zone Region Configuration IE format

| Syntax | Size | Notes |
| --- | --- | --- |
| RS Zone Region Configuration IE { | | |
| Type | 4 bits | 0x00 |
| Length | 4 bits | Length in byte |
| OFDM symbol index for DL_RS Zone | 8 bits | Indicates the OFDM symbol index starting a DL_RS Zone |
| Number of OFDM symbols | 4 bits | Indicates the number of OFDM symbols a DL_RS Zone occupies |
| Number of DL region | 6 bits | Indicates the number of regions defined in DL_RS Zone |
| For (i=0;i<Number of regions; i++){ | | |
| Number of subchannels } | 4 bits | Indicates the number of sub-channels the region includes |
| OFDM symbol index for UL RS_Zone | 8 bits | Indicates the OFDM symbol index starting a UL_RS Zone |
| Number of OFDM symbols | 4 bits | Indicate the number of OFDM symbols a UL_RS Zone occupies |
| Number of UL region | 6 bits | Indicates the number of regions defined in UL_RS Zone |
| For (i=0;I<Number of region; i++){ | | |
| Number of slots } | 4 bits | Indicates the number of slots the region includes |
| Number of frames before effective | 4 bits | Indicates the number of frames before the configuration takes effect (starting from the current frame) |
| } | | |

The "Type" and "Length" fields indicate the length of the IE and the type of IE.

The "OFDM symbol index for DL_RS Zone" field indicates an index of the OFDM symbol at which the DL_RS Zone begins. The first "Number of OFDM symbols" field indicates a number of OFDM symbols which the DL_RS Zone occupies. The "Number of DL region" field indicates a number of regions defined in the DL_RS Zone. For each DL region the IE also includes a "Number of sub-channels" field that indicates the number of sub-channels in the DL region. The "OFDM symbol index for UL_RS Zone" field indicates an index of the OFDM symbol at which the UL_RS Zone begins. The second "Number of OFDM symbols" field indicates a number of OFDM symbols which the UL_RS Zone occupies. The "Number of UL region" field indicates a number of regions defined in UL_RS Zone. For each UL region the IE also includes a "Number of slots" field that indicates the number of slots in the UL region. The "Number of frames before effective" field indicates a number of frames before the configuration takes effect, starting from the current frame.

The size of each of the fields in Table 5 is indicated in bits. It is to be understood that the field size is implementation specific and the provided size is merely for example purposes.

While the RS Zone BRU Configuration IE and the RS Zone Region Configuration IE in the examples of Tables 4 and 5 are each presented in the format of an IE, other formats for providing this information to RSs are considered to be within the scope of the invention described herein.

RS BRU Resource Assignment IE

The RS BRU Resource Assignment IE is used for resource assignment to an RS or multiple RS using a BRU as an RS resource assignment unit. Table 6 illustrates an example of a BRU Resource Assignment IE format with particular field sizes and field contents.

TABLE 6

RS BRU Resource Assignment IE format

| Syntax | Size | Notes |
| --- | --- | --- |
| RS BRU Resource Assignment IE { | | |
| Type | 4 bits | 0x01 |
| RSID | 8 bits | Relay station ID |
| Number of DL BRU | 6 bits | Indicates the number of DL BRUs assigned to an RS identified by RSID |
| DL MCS | 4 bits | Indicates the modulation and coding scheme (MCS) to be used in the resource assignment for the RS identified by RSID |
| Number UL BRU | 6 bits | Indicates the number of UL BRUs assigned to an RS identified by RSID |
| UL MCS | 4 bits | Indicates the MCS to be used in the resource assignment for the RS identified by RSID |
| } | | |

The "Type" field defines the type of IE. This particular IE has a fixed length, in the example of Table 6, this is equal to 4 bytes; therefore no "Length" field is included. The "RSID" field indicates a particular destination RS the resource assignment is directed to "Number of DL BRU" field and the "Number of UL BRU" field in this IE are respective system parameters broadcast in the RS Zone BAU Configuration IE. The "DL MCS" and "UL MCS" fields indicate the modulation and coding scheme (MCS) used for each of the downlink and uplink resource allocations, respectively.

The size of each of the fields in Table 6 is indicated in bits. It is to be understood that the field size is implementation specific and the provided size is merely for example purposes.

While the RS BRU Resource Assignment IE may be useful in particular embodiments, for example when the resource assigned to a given RS is a sequential group of DL or UL BRUs of the same number of sub-channels, in some embodiments it may be beneficial to have a resource assignment that identifies a particular DL or UL region, for example as defined by the RS Zone Region Configuration IE described above. An example of providing such a resource assignment is the Region Resource Assignment IE described below.

RS Region Resource Assignment IE

The Region Resource Assignment IE is used for resource assignment to an RS or multiple RS using a region as an RS resource assignment unit. Table 7 illustrates an example of a Region Resource Assignment IE format with particular field sizes and field contents.

TABLE 7

RS Region Resource Assignment IE format

| Syntax | Size | Notes |
| --- | --- | --- |
| RS Region Resource Assignment IE { | | |
| Type | 4 bits | 0x01 |
| RSID | 8 bits | Relay station ID |
| DL region ID | 6 bits | Indicates an identification of a DL region assigned to an RS identified by RSID |
| DL MCS | 4 bits | Indicates the MCS to be used in the resource assignment for the RS identified by RSID |
| UL region ID | 6 bits | Indicates an identification of an UL region assigned to an RS identified by RSID |
| UL MCS | 4 bits | Indicates the MCS to be used in the resource assignment for the RS identified by RSID |
| } | | |

The "Type" field defines the type of IE. This particular IE has a fixed length, in the example of Table 7, this is equal to 4 bytes, so no "Length" field is included. The "RSID" field indicates a particular destination RS the resource assignment is directed to "DL region ID" field and "UL region ID" field in this IE are defined in region configuration information provided elsewhere in the R-MAP, for example in the RS Zone Region Configuration IE described above. The "DL MCS" and "UL MCS" fields indicate the modulation and coding scheme (MCS) used for each of the down link and up link resource assignments, respectively.

The size of each of the fields in Table 7 is indicated in bits. It is to be understood that the field size is implementation specific and the provided size is merely for example purposes.

In some embodiments, the size of the resource assignment IEs are not a fixed length. In such a case, a length field may be included in the IE.

TDM Channelization

Figure 3:
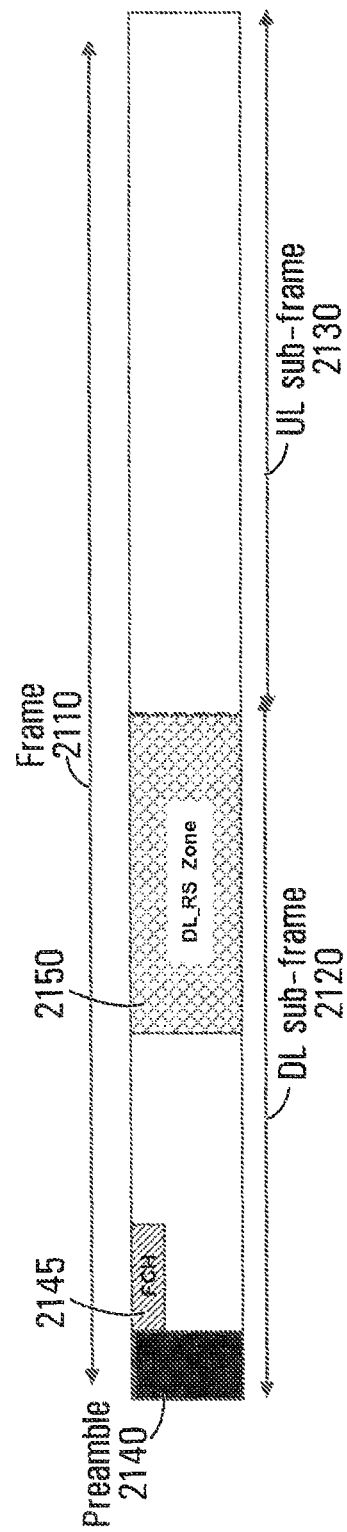

A first example of DL Resource Multiplexing between BS/RS and RS and between BS/RS and MS employs the above-introduced DL RS_Zone for the transmission from BS/RS to RS. The DL RS_Zone concept is illustrated in FIG. 3. In FIG. 3, a frame 2110 is a two dimensional channel resource in which one dimension is represented by logical sub-channels and the other dimension is represented by OFDM symbols. The frame 2110 includes a DL sub-frame 2120 and a UL sub-frame 2130. In the DL sub-frame 2120 there is a preamble 2140 and a FCH 2145. A DL_RS Zone 2150 is also included in the DL sub-frame 2120. This enables the definition of sub-channel types with larger resource granularity and therefore less assignment overhead.

In some embodiments, the DL_RS Zone 2150 is consistent with the DL_RS Zone described above with regard to FIG. 2.

A DL_RS Zone can, for example, be defined to include one or multiple OFDM symbol(s) within a corresponding DL sub-frame or to include an entire DL sub-frame.

Having defined the DL_RS Zone, sub-channelization can be performed to provide assignment granularity. In some embodiments, a bin concept similar to that used for 802.16e AMC (adaptive modulation and coding) sub-channelization is employed to define a building block for sub-channelization of the DL_RS Zone. A bin is defined as a group of contiguous sub-carriers (G) in one OFDM symbol. Sub-carriers in a bin indexed as k are re-indexed as sub-carrier (k,i)=sub-carrier Gk+i (i=0, 1, . . . , G−1). Each bin includes pilot sub-carriers.

The following is a specific example of how the bin concept can be implemented, but other examples are possible. For one antenna, a sub-carrier indexed with a floor (G/2) is reserved as a pilot sub-carrier. The term "floor" is being used as a mathematical function for rounding a real number to a largest integer less than or equal to the real number. For two antennas, two sub-carriers indexed with floor(G/2) and floor(G/2)+1 respectively, are reserved as pilot sub-carriers, one pilot sub-carrier for each antenna. For four antennas, four sub-carriers indexed with floor(G/2), floor(G/2)−1, floor(G/2)+1 and floor(G/2)+2 respectively, are reserved as pilot sub-carriers, one pilot sub-carrier for each antenna.

Figure 4:
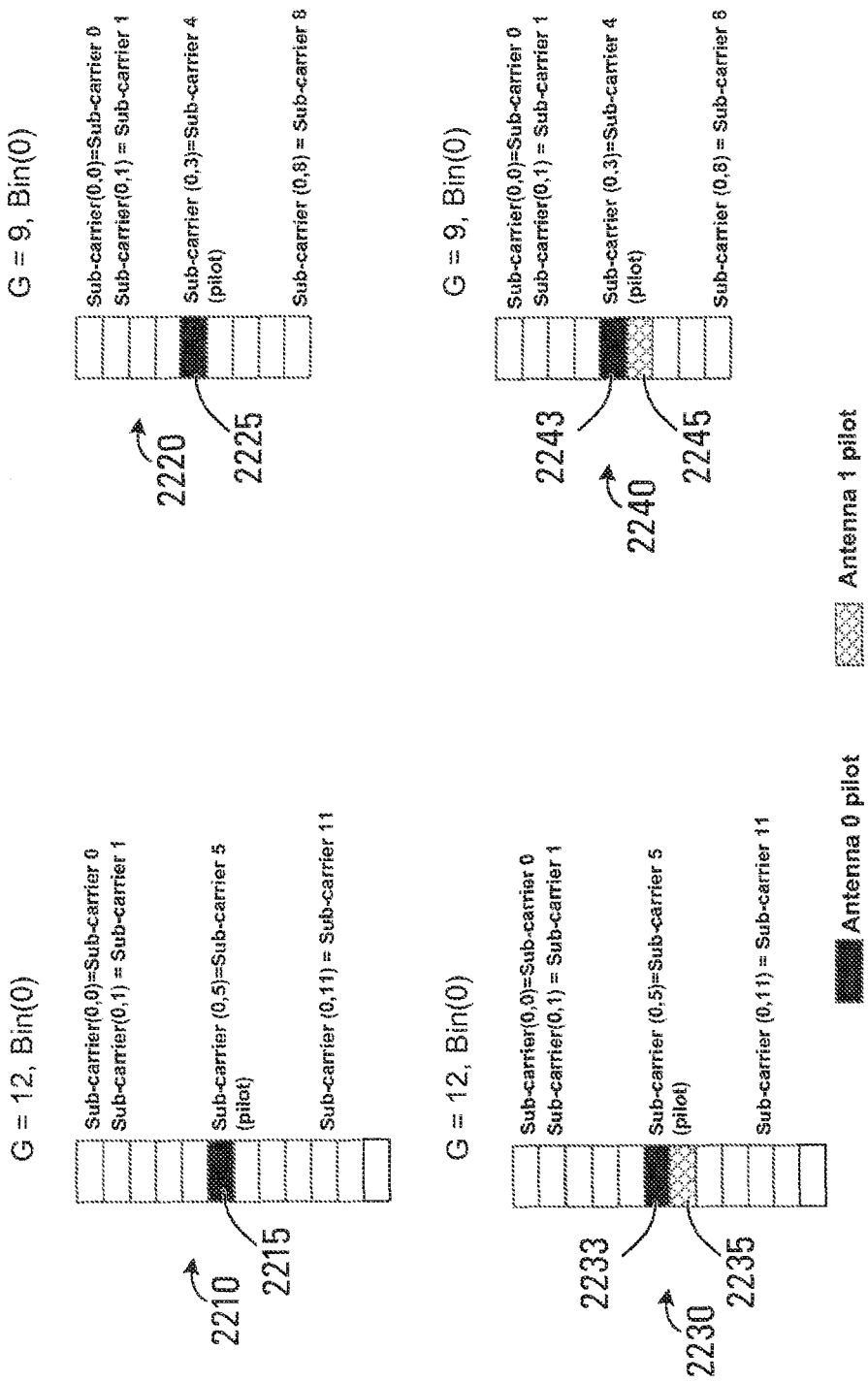
FIG. 4 is a set of schematic diagrams of bin construction for even and odd bin sizes.

Examples of bin construction for even and odd bin sizes for one and two antennas are provided in FIG. 4. Each of the examples depicts a single column of rectangular boxes in which the column represents the bin and each box represents a sub-carrier in the bin. Bin constructions for use in single antenna implementations are illustrated at 2210 and 2220. A bin with G=12 including a pilot in the sixth sub-carrier 2215 is illustrated at 2210. A bin with G=9 including a pilot in the fifth sub-carrier 2225 is illustrated at 2220. Bin constructions for use in two antenna implementations are illustrated at 2230 and 2240. A bin with G=12 including a pilot for a first antenna in the sixth sub-carrier 2233 and a pilot for a second antenna in the seventh antenna 2235 is illustrated at 2230. A bin with G=9 including a pilot for a first antenna in the fifth sub-carrier 2243 and a pilot for a second antenna in the sixth antenna 2245 is illustrated at 2240.

The bins thus defined can then be used to define sub-channels to allow for DL resource multiplexing. Sub-channelization can be defined by a matrix of N×M bins, in which N is a number of contiguous bins within an OFDM symbol and M as a number of consecutive OFDM symbols. The following are specific examples of sub-channel types that might be provided: 1×12; 1× size of RS Zone (size of RS Zone=number of OFDM symbols of RS Zone); 2×6; 2×12; 2× size of RS Zone; 3×6; 3×12; 3× size of RS Zone; 4×6; 4×12; 4× size of RS Zone; 6×6; 6×12; 6× size of RS Zone. More generally, the size of the sub-channel is implementation specific and can be a size other than the particular example described above.

Figure 5:
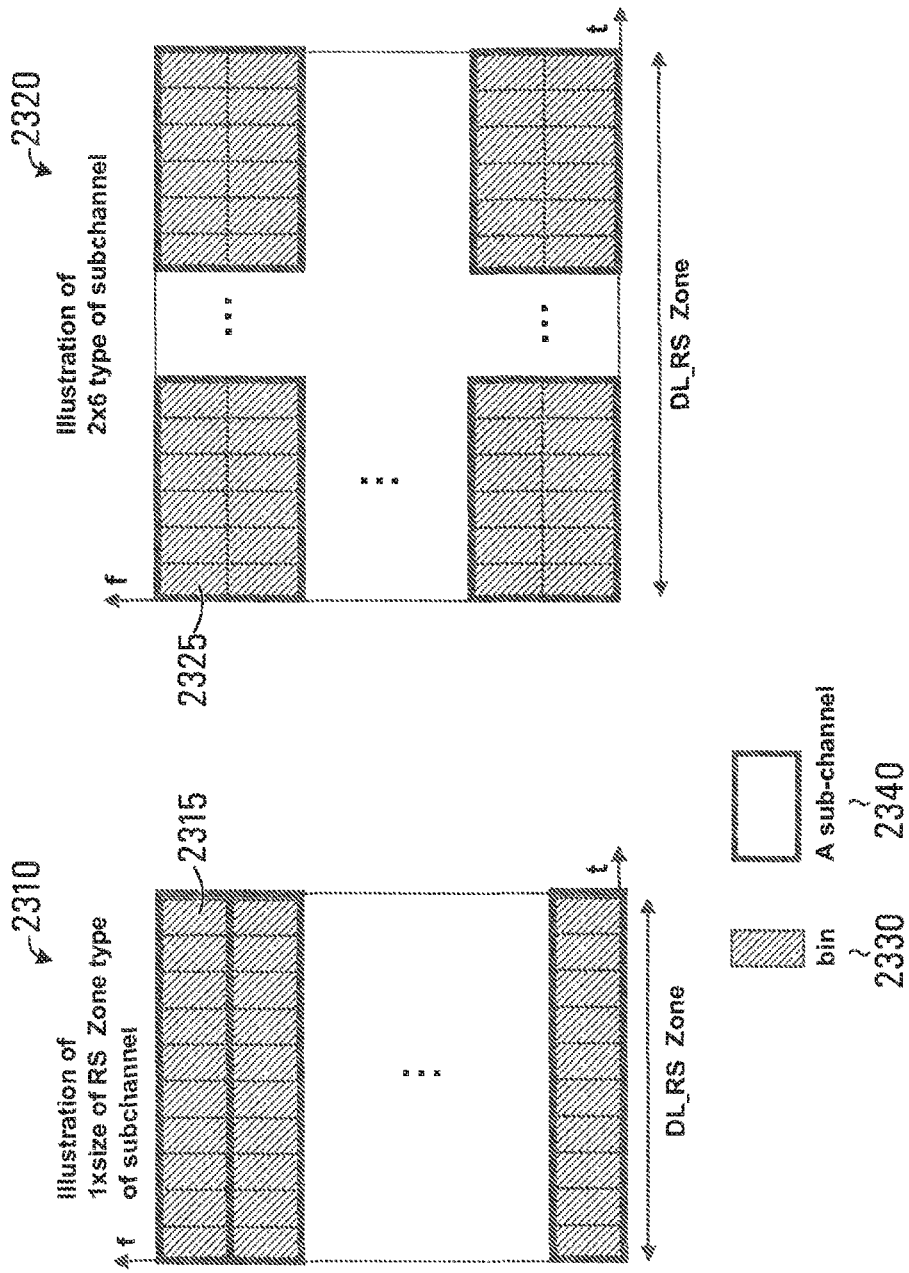
FIG. 5 is a set of schematic diagrams of two specific sub-channel definitions.

FIG. 5 contains examples of two specific sub-channel definitions. Individual bins are identified by a single cross hatched element indicated at 2330. A sub-channel including multiple bins is identified by a thick outline around the multiple bins, as indicated at 2340. A "1× size of RS Zone" type sub-channel is indicated at 2315 in which the sub-channel is a single row of bins equal to the length of the DL_RS Zone. A "2×6" type sub-channel is indicated at 2325 in which the sub-channel is a matrix that is two rows of six bins. The DL_RS Zones 2310 and 2320 include an implementation specific number of such sub-channels.

FDM Channelization

In another embodiment, DL Resource Multiplexing between BS/RS and RS and BS/RS and MS is employed on an FDM (frequency division multiplexing) basis. This is particularly applicable in partially used sub-carrier (PUSC) based systems. In a PUSC allocation, full channel diversity is achieved by distributing allocated sub-carriers to sub-channels, whereby the allocated sub-carriers are a subset of the entire available bandwidth. For example, in 802.16e, all available sub-carriers used for pilots and data in an OFDM symbol are divided into a set (for example six) of major groups and typically two of these major groups are assigned to each sector of a multi-sector transmitter. In another embodiment, a respective fractional number of major groups such as these are dedicated to BS/RS to RS transmission.

In some embodiments, a method employed for sub-channelization is that which is defined in 802.16e, which is hereby incorporated by reference in its entirety. This is a distributed type of channel on the basis of the sub-carriers.

In some embodiments, a sub-channel is defined so as to enlarge sub-channel size. This is a similar concept to the above-described bin-based sub-channelization, but in which the bin is replaced by a cluster. In some embodiments, clusters of a given sub-channel are not contiguous. In some embodiments, a cluster is a group of bins. As the clusters of a given sub-channel do not need to be contiguous, a diversity type of sub-channelization is allowable on the basis of clusters to be defined.

Figure 6:
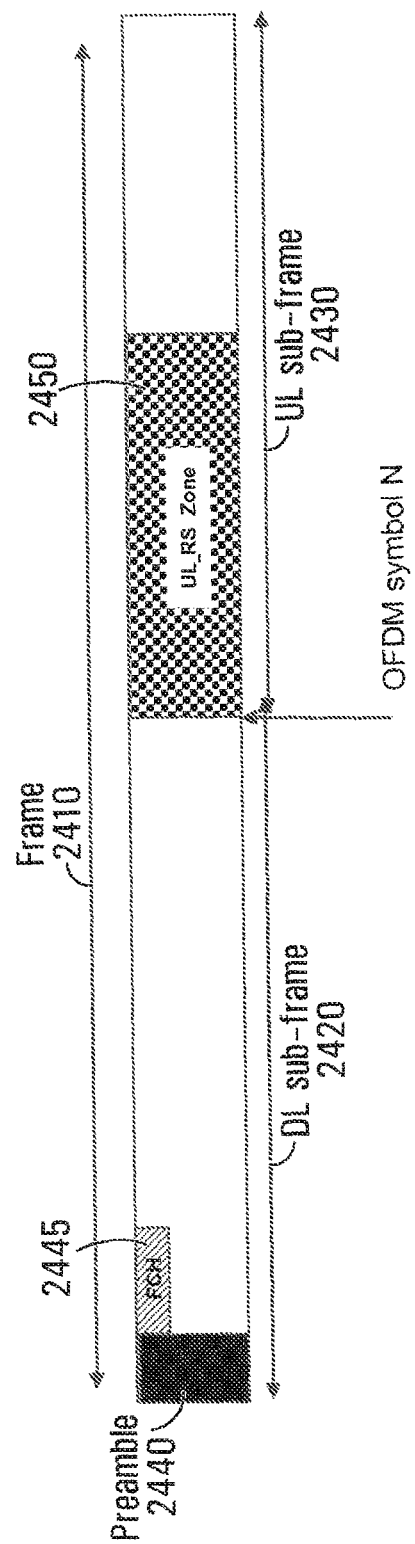
FIG. 6 is a schematic diagram of a frame structure according to an embodiment of the invention.

For UL Resource Multiplexing between RS and BS/RS and between MS and BS/RS, the above-introduced UL_RS Zone can be employed, as depicted in FIG. 6 by way of example. In FIG. 6, a frame 2410 is a two dimensional channel resource in which one dimension is represented by logical sub-channels and the other dimension is represented by OFDM symbols. The frame 2410 includes a DL sub-frame 2420 and a UL sub-frame 2430. In the DL sub-frame 2420 there is a preamble 2440 and a FCH 2445. A UL_RS Zone 2450 is also included as a portion of the UL sub-frame 2430. The UL_RS Zone is used for the transmission from RS to BS/RS and enables the definition of new types of sub-channels. The new types of sub-channels may for example reduce the pilot overhead for fixed or low mobile RS and/or allow for larger resource granularity thereby achieving less assignment overhead. In some embodiments, the UL_RS Zone is consistent with embodiments described above with regard to FIG. 2.

The UL_RS Zone definition can for example include one or multiple OFDM symbol(s) within corresponding UL sub-frames, or may include an entire UL sub-frame.

The UL_RS Zone sub-channelization can for example be based on the enhancement of current 802.16e channelization using bin definitions.

A UL bin definition is defined as a group of contiguous sub-carriers (G) in one OFDM symbol. Sub-carriers in a bin indexed as k are re-indexed as sub-carrier(k,i)=sub-carrier Gk+i (i=0, 1, . . . , G−1). Bin_without_pilot is defined as a bin where all sub-carriers are used for data; Bin_with_pilot is defined to include pilots. In some embodiments, transmissions include sets of bins some of which contain pilots and others of which do not to reduce overhead. An example of a bin_with_pilot definition for one antenna is a bin where one sub-carrier is indexed with a floor(G/2) reserved as a pilot sub-carrier. An example of a bin_with_pilot definition for two antennas is a bin where two sub-carriers are indexed with floor(G/2) and floor(G/2)+1 reserved as pilot sub-carriers. For example, a first antenna transmits a pilot at index floor(G/2) and a null symbol location at index floor (G/2)+1 and a second antenna transmits a pilot at index floor(G/2)+1 and a null symbol location at index floor(G/2). More generally, in some embodiments, a first bin definition includes pilot symbols, and a second bin definition does not include pilot symbols, and a combination of the two bin definitions is used for a given sub-channel.

Figure 7:
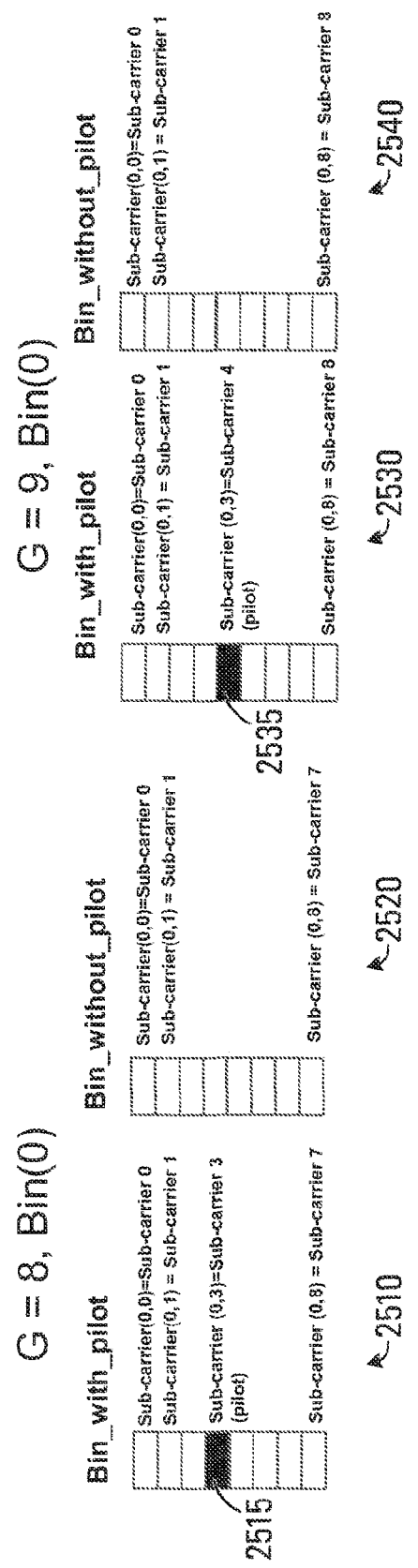
FIG. 7 is a set of schematic diagrams of bin construction for two different bin sizes, and for bins with and without pilots.

FIG. 7 shows specific examples of bin definitions for two different bin sizes and for bins with and without pilots. Each of the examples depicts a single column of rectangular boxes in which the column represents the bin and each box represents a sub-carrier in the bin. A bin for G=8 including a pilot in the fourth sub-carrier 2515 is illustrated at 2510. A bin for G=8 without a pilot is illustrated at 2520. A bin for G=9 including a pilot in the fifth sub-carrier 2535 is illustrated at 2530. A bin for G=9 without a pilot is illustrated at 2540.

Figure 8:
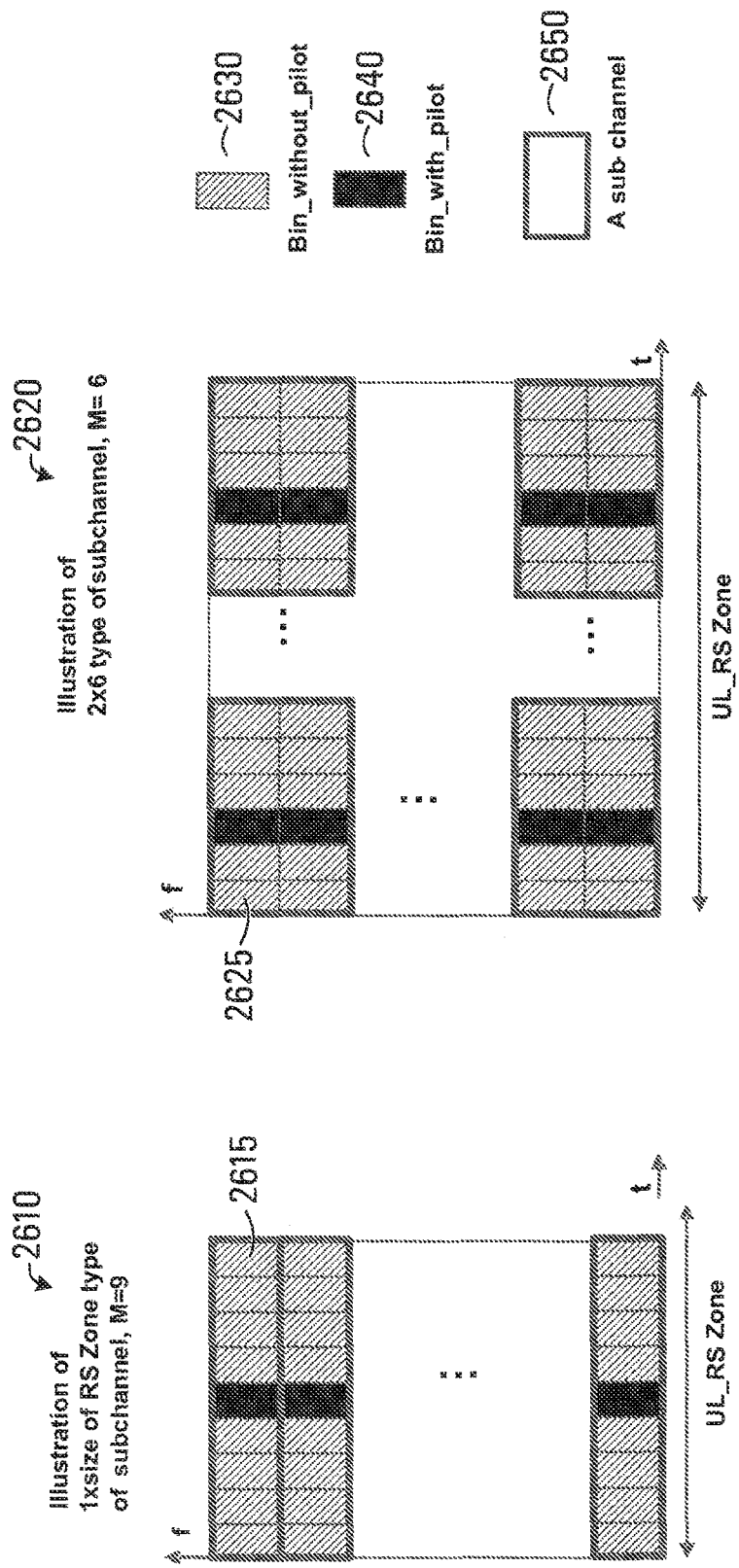
FIG. 8 is a set of schematic diagrams of two specific sub-channel definitions.

Having defined a bin as a basic unit of channelization, sub-channels can be defined similar to how it was done for downlink channelization. Specific examples in FIG. 8 illustrate a given type of sub-channel (M, which is a number of OFDM symbols in the sub-channel is known in which all bins are "bin_without_pilot" bins, except the bins in an OFDM symbol indexed with floor[M/2]. Other breakdowns between bins with pilots and without pilots can be employed. In the illustrated example of FIG. 8, individual "bin_without_pilot" bins are identified by a single cross hatched element as indicated at 2630 and "bin_with_pilot" bins are identified by a single solid black element as indicated by 2640. A sub-channel including multiple bins is identified by a thick outline around the multiple bins as indicated by 2650. A "1× size of RS Zone" type sub-channel is indicated at 2615 in which the sub-channel is a single row of bins equal to the length of the UL_RS Zone. A "2×6" type sub-channel is indicated at 2325 in which the sub-channel is a matrix that is two rows of six bins. The UL_RS Zones 2610 and 2620 include an implementation specific number of such sub-channels.

In some embodiments, UL Resource Multiplexing between RS and BS/RS and MS and BS/RS is performed using FDM, which is particularly appropriate for PUSC and/or optional PUSC. In some embodiments, a tile structure as defined in 802.16e is employed. In some embodiments, a new tile structure RS_tile is defined. A UL tile can be defined as an N×M structure in which N is the number of contiguous sub-carriers within an OFDM symbol and M is the number of OFDM symbols. In this context, a tile is a group of time-frequency resources that includes a band of sub-carriers being used for signal transmission over a given number of OFDM symbols. The sub-carriers in the band may be a group of contiguous frequencies or a logical grouping of non-contiguous frequencies.

In a particular example, an RS_tile type 24×3 (a band of 24 sub-carriers over 3 OFDM symbol durations) is defined. Additional structure types include those having a size of 24×6, 24×12 and 24× size of UL RS_Zone. More generally, the size of the RS_tile is implementation specific and can be a size other than the particular example described above.

Figure 9:
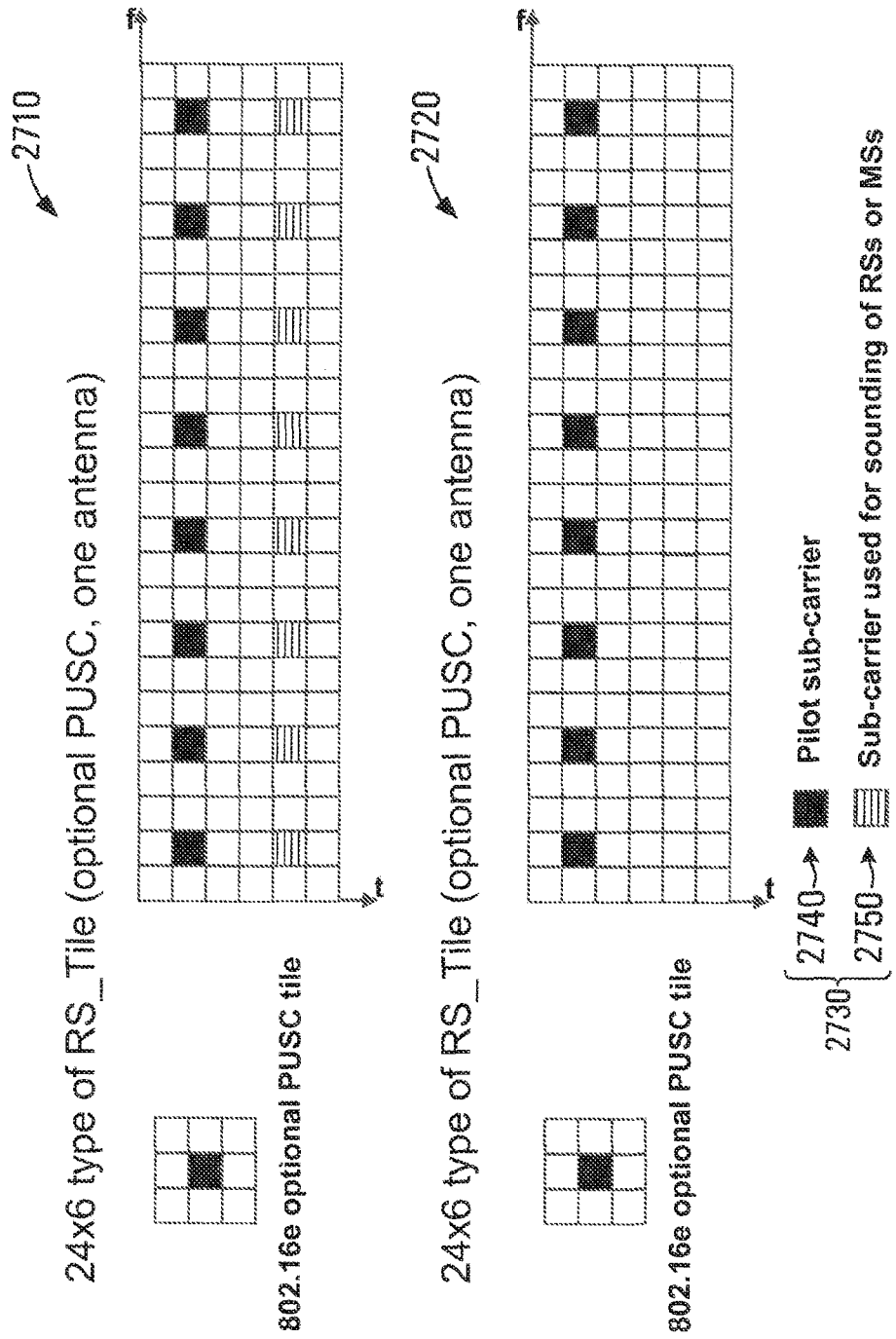
FIG. 9 is a group of schematic diagrams of pilot patterns to be used by a relay station according to some embodiments of the invention.

In some embodiments, pilot transmission in a tile is performed with a pilot sub-carrier density in RS_tile that is the same as current 802.16e. In some embodiments, part of those sub-carriers are used for transmitting pilots, and part of those sub-carriers are used for sounding. A specific example of this is shown in FIG. 9. Pilot pattern 2710 is an example of a UL OPUSC pilot pattern having a basic tile structure including pilot sub-carriers (indicated by 2740 in legend 2730) in a first row of 3 sub-carrier by 3 OFDM symbol tiles and sub-carriers used for sounding (indicated by 2750 in legend 2730) in a second row of 3 sub-carrier by 3 OFDM symbol tiles. In other embodiments, a pilot density lower than that of the current 802.16e tile is employed. Pilot pattern 2720 is an example of a UL OPUSC pilot pattern having a similar tile structure to 2710 including pilot sub-carriers in a first row of 3 sub-carrier by 3 OFDM symbol tiles and no pilot sub-carriers.

In another embodiment, the entire frame resource is initially assumed to be available for use for RS related transmission (DL/UL). RS sub-channels (RS_sub-channel) can be defined using any appropriate method including but not limited to those described above. In some embodiments, the resource used for MSs is assigned first using 802.16e sub-channels and RS related resources are assigned later using RS sub-channels. All resources occupied by MSs will be punctured out, or removed from the sub-channels to allow for the assigned resource for RS. This avoids hard partitioning between RS related resource and MS related resource.

Description of Example Components of a Relay System

Figure 10:
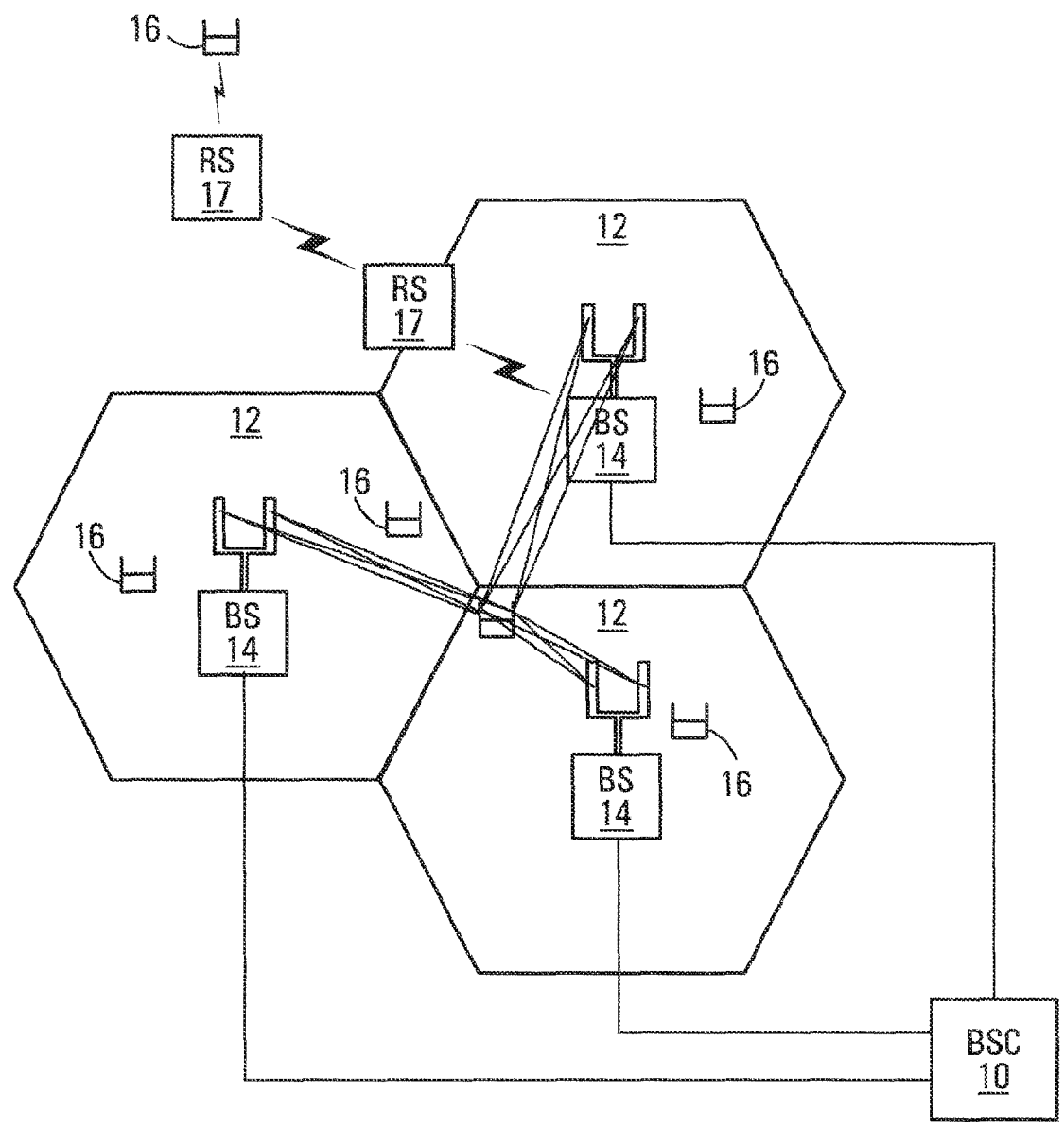
FIG. 10 is a block diagram of a cellular communication system.

For the purpose of providing context for embodiments of the invention for use in a communication system, FIG. 10 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. Also shown are relay stations 17.

Figure 11:
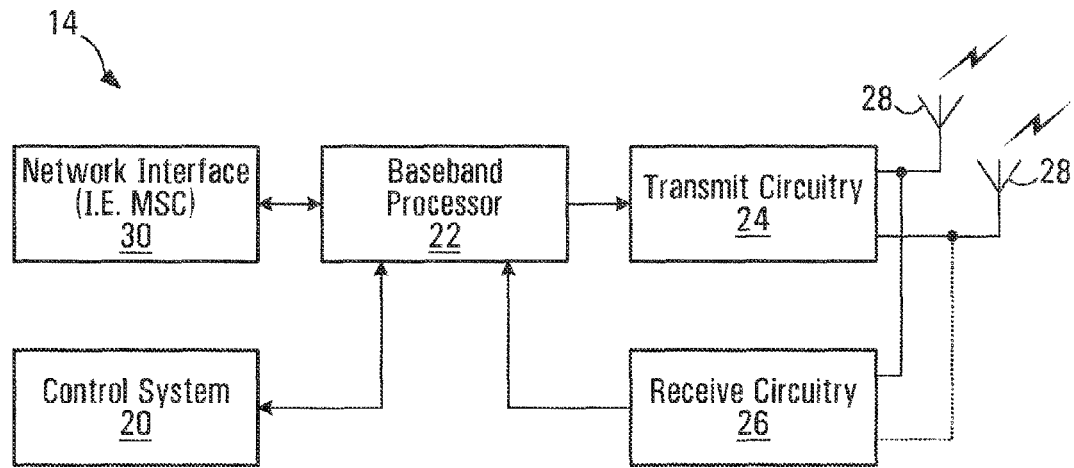
FIG. 11 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 11, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 10). A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 12:
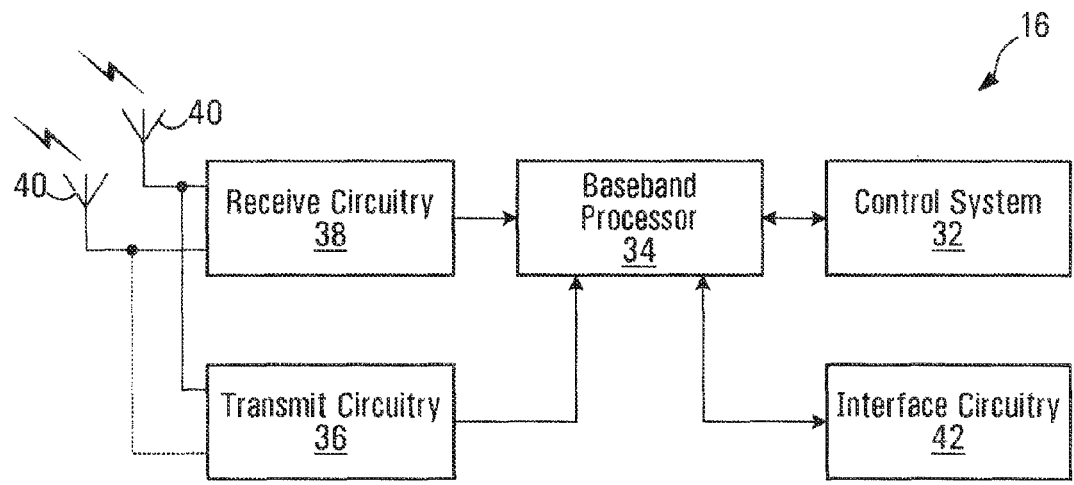
FIG. 12 is a block diagram of an example wireless terminal that might be used to implement some embodiments of the present invention.

With reference to FIG. 12, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals.

Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labelled only for clarity.

Figure 13:
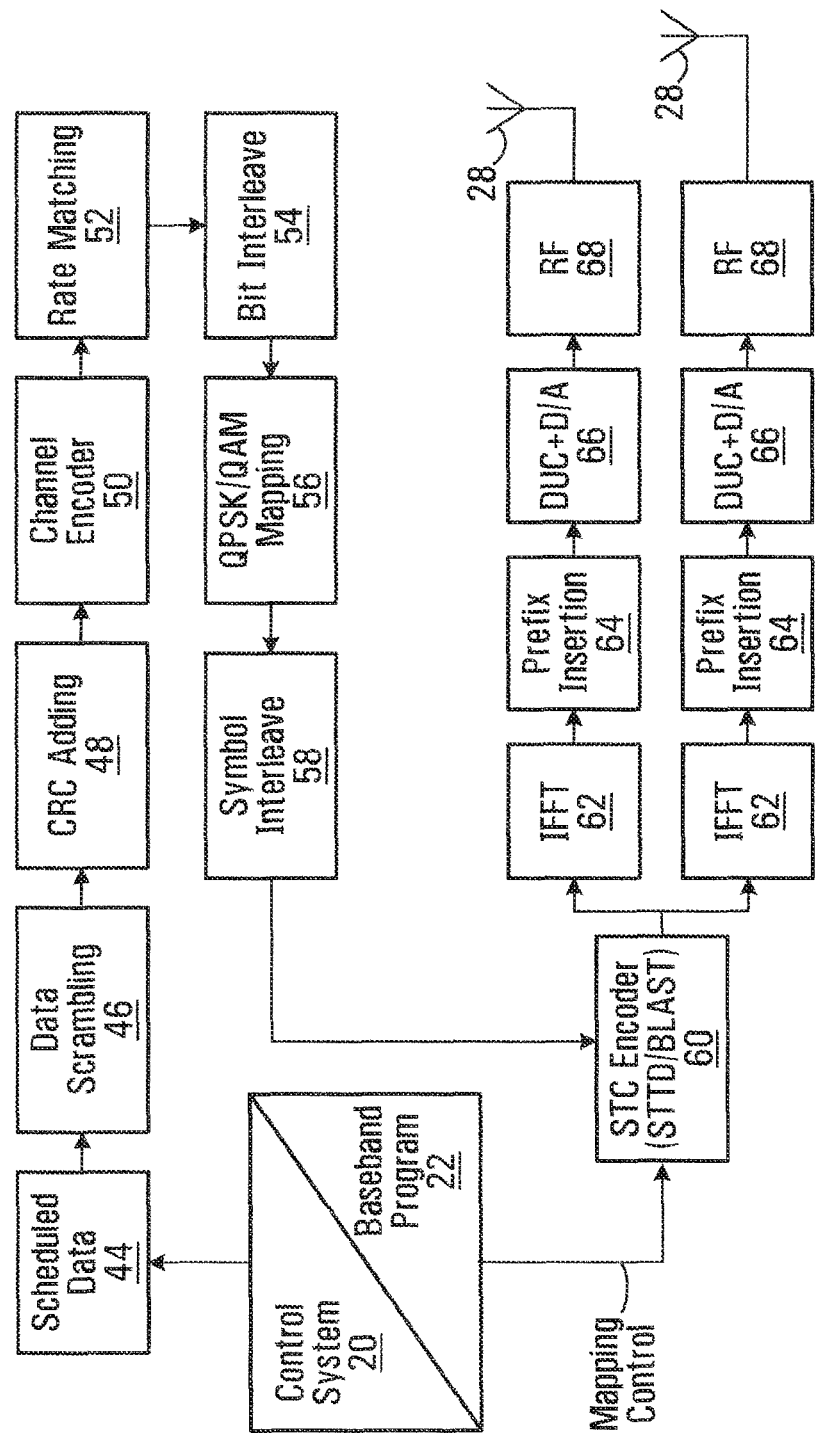
FIG. 13 is a block diagram of a logical breakdown of an example OFDM transmitter architecture that might be used to implement some embodiments of the present invention.

With reference to FIG. 13, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 11 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUO) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 14:
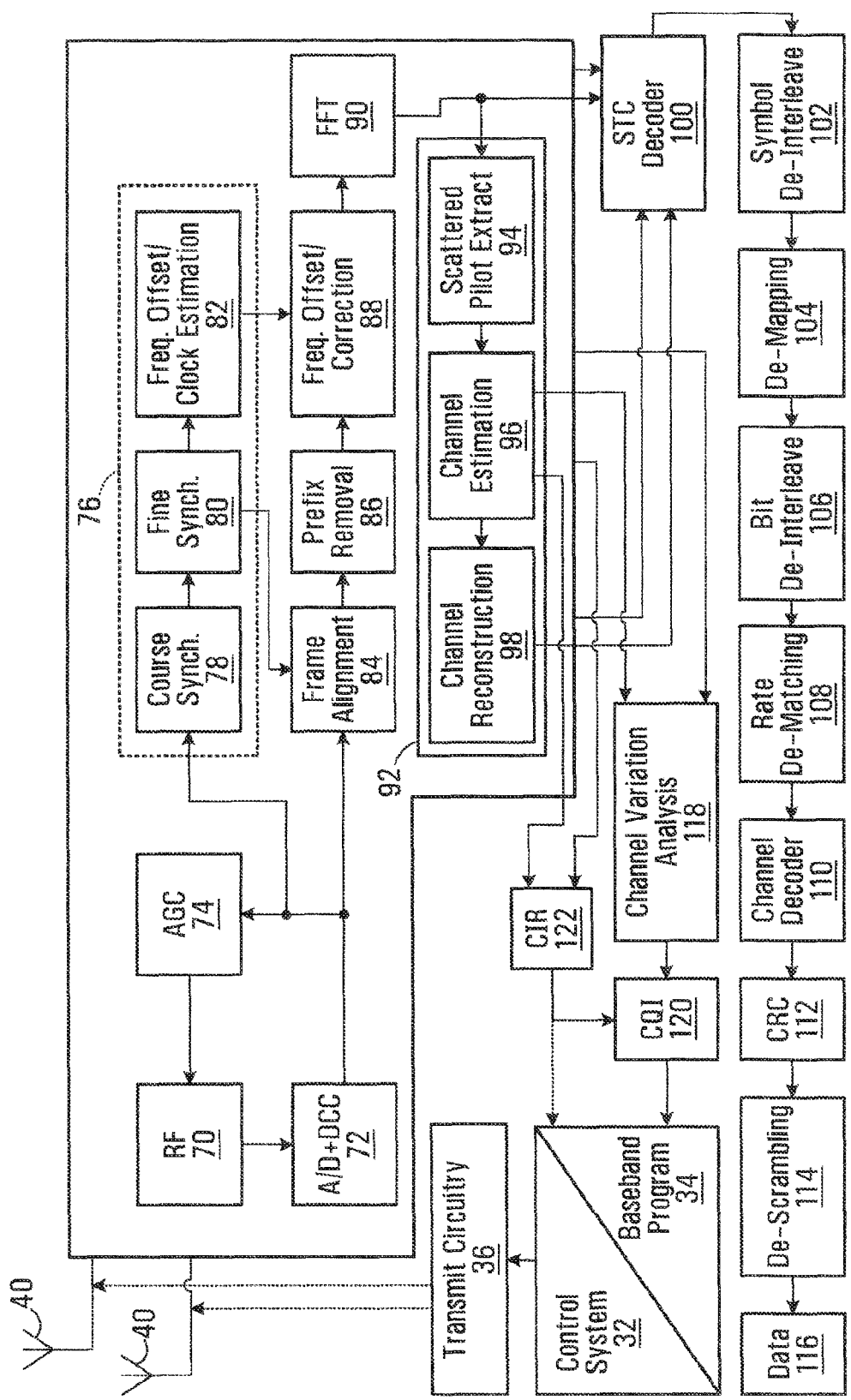
FIG. 14 is a block diagram of a logical breakdown of an example OFDM receiver architecture that might be used to implement some embodiments of the present invention.

Reference is now made to FIG. 14 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGO) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 14, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleave/logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 10 to 14 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

For multi-hop implementations such as described previously, each relay node will include some transmitting functionality and some receiving functionality. For example, a relay station may include components of the example OFDM transmitter architecture and the example OFDM receiver architecture.

Numerous modifications and variations of the present invention are possible in light of the above teachings. It is therefore to be understood that within the scope of the appended claims, the invention may be practised otherwise than as specifically described herein.

The invention claimed is:

1. A method for use in an orthogonal frequency division multiplexed (OFDM) communication system employing relay stations (RSs) comprising:
   assigning a distinct pseudo-random noise (PN) sequence to each base station (BS) and each RS;
   storing, in each RS, the distinct PN sequence for the respective RS;
   generating, by each RS, a preamble based on the distinct PN sequence for the respective RS; and
   transmitting by each RS, a signal to at least one mobile station (MS), the signal including the preamble corresponding to the respective RS.

2. The method of claim 1, further comprising, for purposes of routing, identifying each BS or RS by a BS identification in one of the management messages.

3. The method of claim 2, wherein identifying each RS comprises assigning each RS a base station identifier in the management message.

4. The method of claim 1, wherein assigning a distinct PN sequence for a mobile relay station (MRS) is statically defined even when there is a handoff.

5. The method of claim 4, further comprising defining for MRSs a system reserved PN index so as to avoid collisions when a MS moves across the OFDM communication system.

6. The method of claim 4, wherein the PN index is re-assigned during when a MS moves across the OFDM communication system and further comprising informing any attached MSs of the change and/or performing re-synchronization.

7. The method of claim 1, further comprising:
   modifying a management message to include the distinct PN sequence; and
   identifying one of the respective RSs based on the management message.

8. A relay station configured to communicate via an orthogonal frequency division multiplexed (OFDM) communication system, comprising:
   a memory; and
   a processor configured to:
      use one pseudo-random noise (PN) sequence from a plurality of PN sequences, wherein the one PN sequence is distinct from PN sequences assigned to other relay stations and base stations in a communication area of the relay station;
      store the distinct PN sequence for the relay station in the memory generate a preamble based on the distinct PN sequence for the relay station; and transmit a signal to at least one mobile station (MS), the signal including the preamble.

9. The relay station of claim 8, wherein the processor is further configured to, for purposes of routing;
identify each BS or RS by a BS identification in one of the management messages.

10. The relay station of claim 9, wherein identifying each RS comprises assigning each RS a base station identifier in the management message.

11. The relay station of claim 8, wherein assigning a distinct PN sequence for a mobile relay station (MRS) is statically defined even when there is a handoff.

12. The relay station of claim 11, wherein the processor is further configured to; define, for MRSs, a system reserved PN index so as to avoid collisions when a MS moves across the OFDM communication system.

13. The relay station of claim 11, wherein the PN index is re-assigned during when a MS moves across the OFDM communication system and wherein the processor is further configured to;
inform any attached MSs of the change and/or performing re-synchronization.

14. The relay station of claim 8, wherein the processor is further configured to;
modify a management message to include the distinct PN sequence; and
identify one of the respective RSs based on the management message.

15. A non-transitory computer readable storage medium with an executable program stored thereon that is executable by a processor, the computer readable storage medium and processor being configured to communicate via an orthogonal frequency division multiplexed (OFDM) communication system, wherein the program instructs the processor to:

use one pseudo-random noise (PN) sequence from a plurality of PN sequences, wherein the one PN sequence is distinct from PN sequences assigned to relay stations and base stations in a communication area of the processor;

store the distinct PN sequence for the processor in the memory generate a preamble based on the distinct PN sequence for the processor; and transmit a signal to at least one mobile station (MS), the signal including the preamble.

16. The non-transitory computer readable storage medium of claim 15, wherein the processor is further configured to, for purposes of routing;
identify each BS or RS by a BS identification in one of the management messages.

17. The non-transitory computer readable storage medium of claim 16, wherein identifying each RS comprises assigning each RS a base station identifier in the management message.

18. The non-transitory computer readable storage medium of claim 15, wherein assigning a distinct PN sequence for a mobile relay station (MRS) is statically defined even when there is a handoff.

19. The non-transitory computer readable storage medium of claim 18, wherein the processor is further configured to;
define, for MRSs, a system reserved PN index so as to avoid collisions when a MS moves across the OFDM communication system.

20. The non-transitory computer readable storage medium of claim 15, wherein the processor is further configured to;
modify a management message to include the distinct PN sequence; and
identify one of the respective RSs based on the management message.

* * * * *

UNITED STATES PATENT AND TRADEMARK OFFICE
CERTIFICATE OF CORRECTION

PATENT NO.       : 9,553,654 B2
APPLICATION NO.  : 14/965506
DATED            : January 24, 2017
INVENTOR(S)      : Zhang et al.

Page 1 of 1

It is certified that error appears in the above-identified patent and that said Letters Patent is hereby corrected as shown below:

On the Title Page

Item (54) should be replaced with the following Line:
"System and Method for Supporting Orthogonal Frequency Division Multiplexed (OFDM) Communication using Wireless Network Relays."

Item (60) should be replaced with the following Line:
"Continuation of application No. 13/617,490, filed on Sep. 14, 2012, now Pat. No. 9,215,002, which is a division of application No. 12/300,522, filed on Feb. 12, 2009, now Pat. No. 9,071,321, which is a national stage entry of application No. PCT/CA07/00965, filed on May 31, 2007."

Signed and Sealed this
Tenth Day of April, 2018

Andrei Iancu
*Director of the United States Patent and Trademark Office*